United States Patent
Sun et al.

(10) Patent No.: US 11,317,274 B2
(45) Date of Patent: Apr. 26, 2022

(54) ACCESS AND MOBILITY MANAGEMENT POLICY ASSOCIATION TERMINATION METHOD AND APPARATUS

(71) Applicant: HUAWEI TECHNOLOGIES CO., LTD., Guangdong (CN)

(72) Inventors: Haiyang Sun, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/952,960

(22) Filed: Nov. 19, 2020

(65) Prior Publication Data

US 2021/0076191 A1   Mar. 11, 2021

Related U.S. Application Data

(63) Continuation of application No. PCT/CN2019/080233, filed on Mar. 28, 2019.

(30) Foreign Application Priority Data

May 21, 2018   (CN) .......................... 201810491046.6

(51) Int. Cl.
*H04W 8/08* (2009.01)
*H04W 60/06* (2009.01)

(52) U.S. Cl.
CPC ............. *H04W 8/08* (2013.01); *H04W 60/06* (2013.01)

(58) Field of Classification Search
CPC ......... H04W 8/08; H04W 60/06; H04W 8/02; H04W 8/14
See application file for complete search history.

(56) References Cited

U.S. PATENT DOCUMENTS

2019/0109823 A1* 4/2019 Qiao ................... H04L 63/0245
2019/0174449 A1* 6/2019 Shan ..................... H04W 76/11
(Continued)

FOREIGN PATENT DOCUMENTS

CN   109673005 A   4/2019
WO   2018034337 A1   2/2018

OTHER PUBLICATIONS

Ericsson, Handling of AMF and PCF interaction when there is a PLMN change during AMF relocation. 3GPP TSG-SA WG2 Meeting #125, Gothenburg, Sweden, Jan. 22-26, 2018, S2-180182, 13 pages.

(Continued)

*Primary Examiner* — Hoang-Chuong Q Vu

(57) ABSTRACT

In an access and mobility management policy association termination method, a first access and mobility management function apparatus sends first policy control function identifier information of a first policy control function apparatus to a second access and mobility management function apparatus, and sends first deletion request information to the first policy control function apparatus. The first deletion request information is for requesting the first policy control function apparatus to delete an access and mobility management (AM) policy association between the first policy control function apparatus and the first access and mobility management function apparatus for a terminal device. Both the first access and mobility management function apparatus and the first policy control function apparatus then delete AM policy control information for the terminal device.

6 Claims, 15 Drawing Sheets

(56) References Cited

U.S. PATENT DOCUMENTS

| | | | |
|---|---|---|---|
| 2019/0182718 A1* | 6/2019 | Shan | H04W 60/04 |
| 2019/0254094 A1* | 8/2019 | Babu | H04W 76/15 |
| 2019/0313468 A1* | 10/2019 | Talebi Fard | H04W 40/246 |
| 2019/0335392 A1* | 10/2019 | Qiao | H04W 48/16 |
| 2020/0337093 A1* | 10/2020 | Kim | H04W 76/10 |

OTHER PUBLICATIONS

Ericsson, Clarifications on Nudr interactions between PCF and UDR. 3GPP TSG-SA2 Meeting #127, Apr. 16-20, 2018, Sanya, China, S2-184570, 20 pages.

Huawei, HiSilicon, Discussion on AMF-PCF Association Termination. 3GPP TSG-SA2 Meeting #128, Jul. 2-Jul. 6, 2018, Vilnius, Lithuania 3GPP, S2-186488, 4 pages.

3GPP TS 23.502 V15.1.0:"3rd Generation Partnership Project; Technical Specification Group Services and System Aspects;Procedures for the 5G System;Stage 2(Release 15)",Mar. 2018,total 285 pages.

3GPP TS 29.513 V0.5.0 (Apr. 2018);3rd Generation Partnership Project;Technical Specification Group Core Network and Terminals;5G System; Policy and Charging Control signalling flows and QoS parameter mapping; Stage 3 (Release 15 ),Total 46 Pages.

3GPP TS 23.503 V15.1.0 (Mar. 2018);3rd Generation Partnership Project;Technical Specification Group Services and System Aspects;Policy and Charging Control Framework for the 5G System;Stage 2(Release 15),Total 65 Pages.

SA WG2 Meeting #124,S2-179208:"TS23.502: Procedures for policy management when AMF relocation",Huawei, HiSilicon,Nov. 27-Dec. 1, 2017, Reno, Nevada, USA,total 8 pages.

ZTE,"TS23.502 Clarification on Access and mobility related policy",SA WG2 Meeting #127 S2-184196,Apr. 16, 20, 2018, Sanya, China,Total 13 Pages.

SA WG2 Meeting #124,S2-179164:"23.502: AMF to PCF interaction at registration with AMF change.",Ericsson,Nov. 27 Dec. 1, 2017, Reno, Nevada (USA),total 13 pages.

3GPP TS 29.518 V1.1.0 (Apr. 2018);3rd Generation Partnership Project;Technical Specification Group Core Network and Terminals;5G System; Access and Mobility Management Services; Stage 3(Release 15),Total 116 Pages.

\* cited by examiner

ACCESS AND MOBILITY MANAGEMENT POLICY ASSOCIATION TERMINATION METHOD AND APPARATUS

CROSS-REFERENCE TO RELATED APPLICATIONS

This application is a continuation of International Application PCT/CN2019/080233, filed on Mar. 28, 2019, which claims priority to Chinese Patent Application 201810491046.6, filed on May 21, 2018. The disclosures of the aforementioned priority applications are hereby incorporated by reference in their entirety.

TECHNICAL FIELD

This application relates to the communications field, and more specifically, to an access and mobility management policy association termination method and apparatus in the communications field.

BACKGROUND

In a fifth generation (5G) mobile communications system, when a terminal device accesses a 5G network, the terminal device initiates a registration procedure to an access and mobility management function AMF. Then, the AMF selects a policy control function PCF, and establishes an access and mobility management AM policy association with the selected PCF, so as to implement data transmission between the AMF and the PCF.

In a scenario, when the AMF that serves the terminal device changes due to movement of the terminal device or for other reasons, for example, when the AMF that serves the terminal device changes from a first AMF to a second AMF, if the second AMF can reuse a first PCF that establishes an AM policy association with the first AMF, the first AMF may send an identifier of the first PCF to the second AMF, so that the second AMF can reuse the first PCF when selecting a PCF. In this way, AM policy control information stored in the first PCF for the terminal device does not need to be deleted.

However, in the foregoing scenario, if a PCF selected by the second AMF is not the first PCF, the AM policy association between the first PCF and the first AMF cannot be deleted, and AM policy control information stored in the first PCF and the first AMF for the terminal device cannot be deleted, either. Consequently, system resources are wasted.

Therefore, a technology that can save system resources needs to be provided.

SUMMARY

This application provides an access and mobility management policy association termination method and apparatus, so as to save system resources.

According to a first aspect, an access and mobility management policy association termination method is provided. The method includes:

sending, by a first access and mobility management function AMF, first policy control function PCF identifier information of a first PCF to a second AMF;

sending, by the first AMF, first deletion request information to the first PCF, where the first deletion request information is used to request the first PCF to delete an AM policy association between the first PCF and the first AMF for a terminal device, and the first PCF is different from a second PCF; and deleting, by the first AMF, the AM policy control information for the terminal device, where the second AMF is an AMF that currently serves the terminal device, the first AMF is an AMF that serves the terminal device before the second AMF serves the terminal device, the second PCF is a PCF that currently serves the terminal device, and the first PCF is a PCF that serves the terminal device before the second PCF serves the terminal device.

Therefore, according to the access and mobility management policy association termination method provided in this embodiment of this application, when the second PCF selected by the second AMF is different from the first PCF, the first AMF sends, to the first PCF, the first deletion request information that is used to instruct the first PCF to delete the AM policy association, so that the first PCF may delete corresponding AM policy control information, thereby effectively saving system resources.

In a possible implementation, the sending, by the first AMF, first deletion request information to the first PCF includes:

if the first AMF has not received, within preset duration, second deletion request information sent by the first PCF, sending, by the first AMF, the first deletion request information to the second AMF, where the second deletion request information is used to request the first AMF to delete the AM policy control information between the first PCF and the first AMF for the terminal device.

In a possible implementation, the method further includes:

after the first AMF receives de-registration information sent by unified data management UDM, starting, by the first AMF, a timer, where duration of the timer is the preset duration.

Because a time point at which the UDM sends the de-registration information to the first AMF is relatively close to a time point at which the second AMF selects a PCF, if the first AMF starts the timer after receiving the de-registration information, time may be saved.

In a possible implementation, the method further includes:

after the first AMF sends the first PCF identifier information to the second AMF, starting, by the first AMF, a timer, where duration of the timer is the preset duration.

In a possible implementation, before the sending, by the first AMF, first deletion request information to the first PCF, the method further includes:

receiving, by the first AMF, second PCF identifier information of the second PCF that is sent by the second AMF; or receiving, by the first AMF, first indication information sent by the second AMF, where the first indication information is used to indicate that the first PCF is different from the second PCF.

According to a second aspect, an access and mobility management policy association termination method is provided. The method includes:

receiving, by a first policy control function PCF, first deletion request information sent by a first access and mobility management function AMF, where the first deletion request information is used to request the first PCF to delete an AM policy association between the first PCF and the first AMF for a terminal device, and the first PCF is different from a second PCF; and deleting, by the first PCF, AM policy control information for the terminal device, where the first AMF is an AMF that serves the terminal device before a second AMF serves the terminal device, the second AMF is an AMF that currently serves the terminal device, the first PCF is a PCF that serves the terminal device before the second PCF serves the terminal device, and the second PCF is a PCF that currently serves the terminal device.

Therefore, according to the access and mobility management policy association termination method provided in this embodiment of this application, when the second PCF selected by the second AMF is different from the first PCF, the first AMF sends, to the first PCF, the first deletion request information that is used to instruct the first PCF to delete the AM policy association, so that the first PCF may delete the corresponding AM policy control information, thereby effectively saving system resources.

According to a third aspect, an access and mobility management policy association termination method is provided. The method includes:

sending, by a second access and mobility management function AMF, second policy control function PCF identifier information of a second PCF to a first AMF; or sending, by a second AMF, first indication information to a first AMF, where the first indication information is used to indicate that the second PCF is different from the first PCF, where the second AMF is an AMF that currently serves a terminal device, the first AMF is an AMF that serves the terminal device before the second AMF serves the terminal device, the second PCF is a PCF that currently serves the terminal device, and the first PCF is a PCF that serves the terminal device before the second PCF serves the terminal device.

Therefore, according to the access and mobility management policy association termination method provided in this embodiment of this application, the second AMF may send the second PCF identifier information or the first indication information to the first AMF, so that the first AMF may determine whether the second PCF is the same as the first PCF. In this way, when the second PCF is different from the first PCF, the first AMF may send, to the first PCF, information used to instruct the first PCF to delete an AM policy association, so that the first PCF deletes corresponding AM policy control information, and system resources are effectively saved.

According to a fourth aspect, an access and mobility management policy association termination method is provided. The method includes:

receiving, by a second policy control function PCF, association request information sent by a second access and mobility management function AMF, where the association request information is used to request to establish an AM policy association with the second PCF for a terminal device, and the association request information further includes second indication information used to determine whether the second PCF is the same as a first PCF;

sending, by the second PCF, second deletion request information to a first AMF according to the second indication information, where the second deletion request information is used to request the first AMF to delete AM policy control information between the first PCF and the first AMF for the terminal device; and keeping, by the first PCF, AM policy control information for the terminal device, where the second AMF is an AMF that currently serves the terminal device, the first AMF is an AMF that serves the terminal device before the second AMF serves the terminal device, the second PCF is a PCF that currently serves the terminal device, and the first PCF is a PCF that serves the terminal device before the second PCF serves the terminal device.

Therefore, according to the access and mobility management policy association termination method provided in this embodiment of this application, the second PCF that has established the AM policy association with the second AMF receives the second indication information that is sent by the second AMF and that is used to determine whether the first PCF that has established an AM policy association with the first AMF is the same as the second PCF, where the first AMF is an AMF that serves the terminal device before the second AMF serves the terminal device, and the second PCF sends the deletion request information according to the second indication information, so that the first AMF may delete the AM policy control information for the terminal device, and system resources are also saved.

In a possible implementation, the sending, by the second PCF, second deletion request information to a first AMF according to the second indication information includes:

when the first PCF is the same as the second PCF, sending, by the second PCF, the second deletion request information to the first AMF.

In a possible implementation, the second indication information includes first PCF identifier information of the first PCF; and the method further includes:

determining, by the second PCF based on the first PCF identifier information and the second PCF, that the first PCF is the same as the second PCF.

Therefore, according to the access and mobility management policy association termination method provided in this embodiment of this application, the second PCF may receive an identifier (that is, the first PCF identifier information) of the first PCF sent by the second AMF, so as to determine, based on the identifier of the first PCF and an identifier of the second PCF, whether the two PCFs are the same. Therefore, when the first PCF is the same as the second PCF, the deletion request information is sent, so that the first AMF deletes the AM policy control information for the terminal device, and system resources are also saved.

According to a fifth aspect, an access and mobility management policy association termination method is provided. The method includes:

receiving, by a first access and mobility management function AMF, second deletion request information sent by a second policy control function PCF, where the second deletion request information is used to request the first AMF to delete AM policy control information between a first PCF and the first AMF for a terminal device, and the first PCF is the same as the second PCF; and deleting, by the first AMF, the AM policy control information for the terminal device, where the first AMF is an AMF that serves the terminal device before a second AMF serves the terminal device, the second AMF is an AMF that currently serves the terminal device, the second PCF is a PCF that currently serves the terminal device, and the first PCF is a PCF that serves the terminal device before the second PCF serves the terminal device.

Therefore, according to the access and mobility management policy association termination method provided in this embodiment of this application, the first AMF that has established an AM policy association with the first PCF deletes the AM policy control information for the terminal device according to the received second deletion request information sent by the second AMF, so that system resources are saved.

According to a sixth aspect, an access and mobility management policy association termination method is provided. The method includes:

receiving, by a third policy control function PCF, first association request information that is sent by a third access and mobility management function AMF and that is used to request to establish an AM policy association with the third PCF for a terminal device, where the first association request information further includes third AMF identifier information used to identify the third AMF;

receiving, by the third policy control function PCF, second association request information sent by a fourth access and mobility management function AMF, where the second association request information is used to request to establish an AM policy association with the third PCF for the terminal device, and the second association request information further includes fourth AMF identifier information used to identify the fourth AMF;

receiving, by the third PCF, third deletion request information sent by the third AMF, where the third deletion request information is used to request the third PCF to delete the AM policy association between the third PCF and the third AMF for the terminal device, and the third deletion request information further includes the third AMF identifier information; and keeping, by the third PCF, AM policy control information for the terminal device based on the fourth AMF identifier information and the third deletion request information.

Therefore, according to the access and mobility management policy association termination method provided in this embodiment of this application, each AMF (for example, the third AMF or the fourth AMF) that needs to establish an AM policy association with a PCF (for example, the third PCF) sends an identifier of the AMF to the third PCF in an AM policy association connection establishment process, and after preset duration, sends deletion request information that carries an identifier of the AMF. The third PCF compares the recent identifier (for example, an identifier of the fourth AMF) of the AMF that is received during establishment of the AM policy association and the identifier (for example, an identifier of the third AMF) of the AMF that is carried in the received deletion request information. When the two AMFs are different, the third PCF keeps the AM policy control information, and only the third AMF deletes AM policy control information, so that the AM policy control information in the PCF is reused, and system resources are also saved.

According to a seventh aspect, an access and mobility management policy association termination method is provided. The method includes:

receiving, by a third policy control function PCF, first association request information sent by a third access and mobility management function AMF, where the first association request information is used to request to establish an AM policy association with the third PCF for a terminal device, and the first association request information further includes third AMF identifier information used to identify the third AMF;

receiving, by the third PCF, third deletion request information sent by the third AMF, where the third deletion request information is used to request the third PCF to delete AM policy control information between the third PCF and the third AMF for the terminal device, and the third deletion request information further includes the third AMF identifier information; and deleting, by the third PCF, the AM policy control information for the terminal device based on the third AMF identifier information and the third deletion request information.

Therefore, according to the access and mobility management policy association termination method provided in this embodiment of this application, each AMF (for example, the third AMF or a fourth AMF) that needs to establish an AM policy association with a PCF sends an identifier of the AMF to the PCF (for example, the third PCF) in an AM policy association connection establishment process, and after preset duration, sends deletion request information that carries an identifier of the AMF. The third PCF compares the recent identifier (for example, an identifier of the third AMF) of the AMF that is received during establishment of the AM policy association and the identifier (for example, the identifier of the third AMF) of the AMF that is carried in the received deletion request information. When the two AMFs are the same, the third PCF deletes the AM policy control information, and the AMF also deletes AM policy control information, so that system resources are saved.

According to an eighth aspect, an access and mobility management policy association termination method is provided. The method includes:

sending, by a third access and mobility management function AMF to a third policy control function PCF, first association request information that is used to request to establish an AM policy association with the third AMF for a terminal device, where the first association request information further includes third AMF identifier information used to identify the third AMF;

sending, by the third AMF, third deletion request information to the third PCF after preset duration, where the third deletion request information is used to request the third PCF to delete AM policy control information between the third PCF and the third AMF for the terminal device, and the third deletion request information further includes the third AMF identifier information; and deleting, by the third AMF, AM policy control information for the terminal device.

Therefore, according to the access and mobility management policy association termination method provided in this embodiment of this application, each AMF (for example, the third AMF) sends an identifier of the AMF to a PCF (for example, the third PCF) in an AM policy association connection establishment process, and after preset duration, sends deletion request information that carries an identifier of the AMF. In this way, the third PCF may compare the recent identifier of the AMF (for example, the third AMF or another AMF) that is received during establishment of the AM policy association and the identifier (for example, an identifier of the third AMF) of the AMF that is carried in the received deletion request information. When the two AMFs are different, the third PCF keeps the AM policy control information, and only the third AMF deletes the AM policy control information. Alternatively, when the two AMFs are the same, the third PCF deletes the AM policy control information, and the third AMF also deletes the AM policy control information. In this way, system resources are saved.

In a possible implementation, the method further includes:

after the third AMF receives de-registration information sent by unified data management UDM, starting, by the third AMF, a timer, where duration of the timer is the preset duration.

Because a time point at which the UDM sends the de-registration information to the first AMF is relatively close to a time point at which the second AMF selects a PCF, if the first AMF starts the timer after receiving the de-registration information, time may be saved.

According to a ninth aspect, an access and mobility management policy association termination apparatus is provided. The apparatus may be configured to perform operations in any one of the first aspect to the eighth aspect and any possible implementation thereof. For example, the apparatus may include a module or unit configured to perform each operation in any one of the first aspect to the eighth aspect or any possible implementation thereof.

According to a tenth aspect, an access and mobility management policy association termination apparatus is provided. The apparatus includes a processor, a transceiver, and a memory. The processor, the transceiver, and the memory communicate with each other through an inner connection path. The memory is configured to store an instruction. The processor is configured to execute the instruction stored in the memory. When the processor executes the instruction stored in the memory, the foregoing execution enables the apparatus to perform any method in any one of the first aspect to the eighth aspect or any possible implementation thereof.

According to an eleventh aspect, a chip system is provided. The chip system includes a memory and a processor, where the memory is configured to store a computer program, and the processor is configured to invoke the computer program from the memory and run the computer program, so that a communications device on which the chip system is installed performs any method in any one of the first aspect to the eighth aspect and any possible implementation thereof.

According to a twelfth aspect, a computer program product is provided. The computer program product includes computer program code. When the computer program code is run by a communications unit, a processing unit, a transceiver, or a processor of a communications device (such as an AMF or a PCF), the communications device performs the method in any one of the first aspect to the eighth aspect and any possible implementation thereof.

According to a thirteenth aspect, a computer-readable storage medium is provided.

The computer-readable storage medium stores a program, and the program enables a communications device (such as an AMF or a PCF) to perform any method in any one of the first aspect to the eighth aspect and any possible implementation thereof.

According to a fourteenth aspect, a computer program is provided. When the computer program is executed on a computer, the computer implements any method in any one of the first aspect to the eighth aspect and any possible implementation thereof.

DESCRIPTION OF EMBODIMENTS

The following describes technical solutions of this application with reference to accompanying drawings.

The technical solutions of the embodiments of this application may be applied to various communications systems, such as: a long term evolution (LTE) system, an LTE frequency division duplex (FDD) system, an LTE time division duplex (TDD) system, a universal mobile telecommunications system (UMTS), a 5th generation (5G) system, or a new radio (NR) system.

A terminal device in the embodiments of this application may be user equipment, an access terminal, a subscriber unit, a subscriber station, a mobile station, a mobile console, a remote station, a remote terminal, mobile equipment, a user terminal, a terminal, a wireless communications device, a user agent, a user apparatus, or the like. The terminal device may be alternatively a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN). This is not limited in the embodiments of this application.

A network device in the embodiments of this application may be a device configured to communicate with a terminal device. The network device may be an evolved NodeB (eNB or eNodeB) in an LTE system, or may be a radio controller in a cloud radio access network (CRAN) scenario. Alternatively, the network device may be a relay node, an access point, an in-vehicle device, a wearable device, or a network device in a 5G network, or a network device in a future evolved PLMN network. This is not limited in the embodiments of this application.

Figure 1:
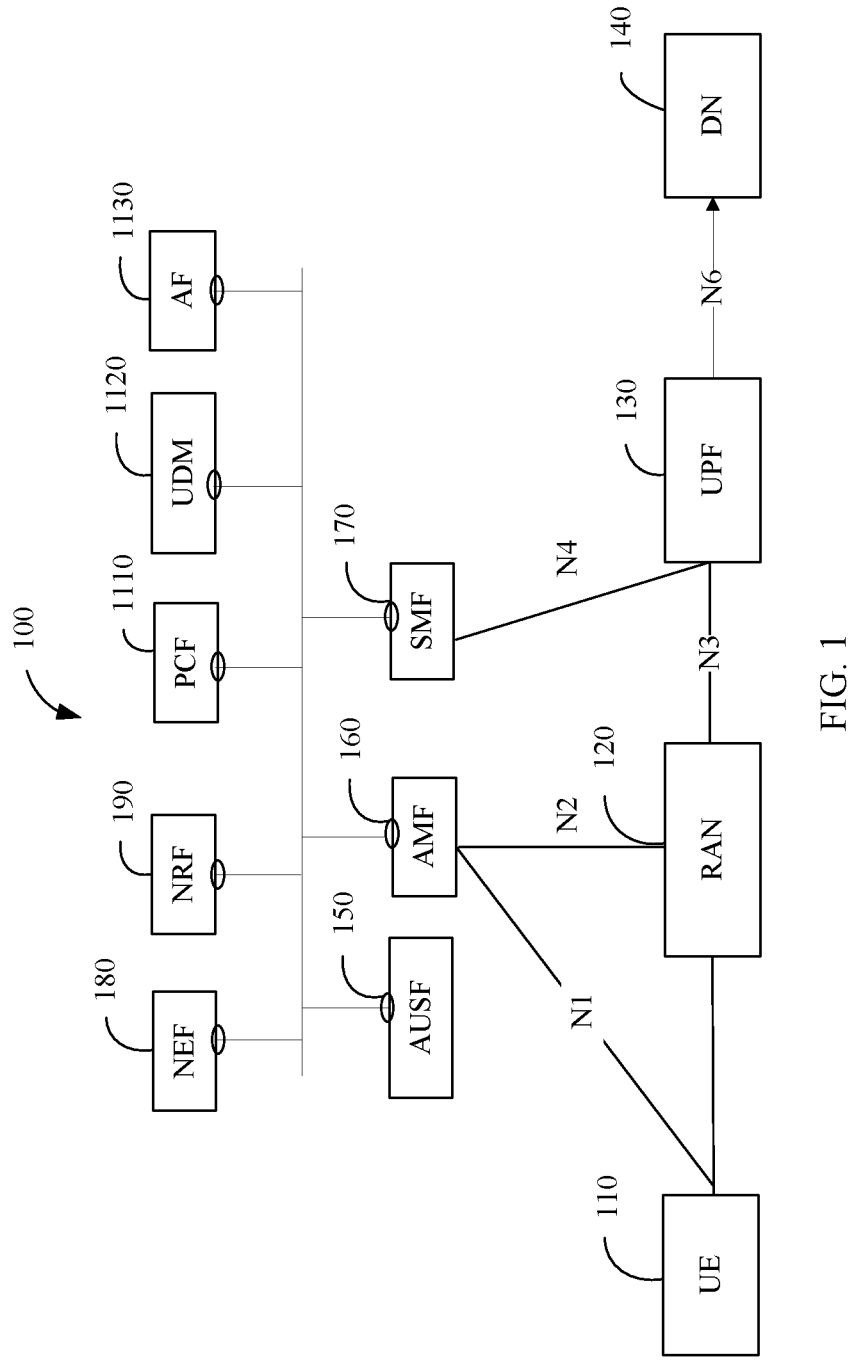
FIG. 1 is a schematic diagram of a possible network architecture applied to an embodiment of this application.

FIG. 1 shows a possible network architecture applied to an embodiment of this application. As shown in FIG. 1, the network architecture is a network architecture described from a perspective of a service interface, and network elements in the network architecture are separately described.

1. A (radio) access network ((R)AN) 120 is used for providing a network access function for an authorized user in a specific area, and can use transmission tunnels of different quality based on a user level, a service requirement, or the like. A (R)AN network element can manage radio resources and provide an access service for a terminal device, so as to forward a control signal and user data between the terminal device and a core network. The (R)AN network element may also be understood as a base station in a conventional network.

2. A user plane function (UPF) 130 is used for packet routing and forwarding, quality of service (QoS) processing of user plane data, and the like.

3. A data network (DN) 140 is a network for transmitting data, such as an Internet network.

4. An authentication server function (AUSF) 150 is mainly used for user authentication and the like.

5. An access and mobility management function (AMF) 160 is mainly used for mobility management, access management, and the like, and may be used for implementing functions other than session management in mobility management entity (MME) functions, such as a lawful interception function and an access authorization or authentication function.

6. A session management function (SMF) 170 is mainly used for session management, internet protocol (IP) address assignment and management of a terminal device, manageable user plane function selection, a termination point of a policy control and charging function interface, a downlink data notification, and the like.

7. A network exposure function (NEF)180 is used for securely opening, to the outside, a service, a capability, and the like that are provided by a 3GPP network function.

8. A network repository function (NRF)190 is used for storing description information of a network function entity and description information of providing a service by the network function entity, and is used for supporting service discovery, network element entity discovery, and the like.

9. A policy control function (PCF)1110 is a unified policy framework used for instructing network behavior, and provides policy rule information and the like for control plane function network elements (such as AMF and SMF network elements).

10. Unified data management (UDM)1120 is used for user identifier processing, access authentication, registration, mobility management, and the like.

11. An application function (AF)1130 is used for performing application-affected data routing, accessing a network exposure function network element, interacting with a policy framework to perform policy control, and the like.

12. A terminal device 110 may include various handheld devices, in-vehicle devices, wearable devices, or computing devices that have a wireless communication function, or another processing device connected to a wireless modem, and terminals, mobile stations (MS), user equipment (UE), software terminals, and the like that are in various forms, such as a water meter, an electricity meter, or a sensor.

In the network architecture, an N2 interface is a reference point of the (R)AN 120 and the AMF 160, and is used for sending a non-access stratum (NAS) message and the like; an N3 interface is a reference point between the (R)AN 120 and the UPF 130, and is used for transmitting user plane data and the like; an N4 interface is a reference point between the SMF 170 and the UPF 130, and is used for transmitting information such as identifier information of a tunnel connected to N3, data cache indication information, and a downlink data notification message; an N6 interface is a reference point between the UPF 130 and the DN 140, and is used for transmitting user plane data and the like.

It should be understood that the foregoing network architecture applied to this embodiment of this application is merely an example of a network architecture described from a perspective of a service architecture, and a network architecture applicable to this embodiment of this application is not limited thereto. Any network architecture that can implement functions of the foregoing network elements is applicable to this embodiment of this application.

For example, in some network architectures, network function entities such as the AMF 160, the SMF 170, the PCF 1110, and the UDM 1120 are all referred to as network functions (NF). Alternatively, in other network architectures, a set of network function entities such as the AMF 160, the SMF 170, the PCF 1110, and the UDM 1120 may be all referred to as control plane functions (CPF).

For ease of description, the foregoing network architecture is used as an example, and a registration procedure performed after a terminal device accesses a network in an embodiment of this application is simply described with reference to FIG. 2.

S201. The terminal device sends a registration request to a (R)AN.

S202. The (R)AN selects, for the terminal device, a proper AMF that can serve the terminal device.

S203. The (R)AN sends the registration request to a second AMF.

S204. The second AMF sends, to a first AMF, information that is used to request a context of the terminal device stored in the first AMF.

Herein, due to movement of the terminal device or for other reasons, an AMF that serves the terminal device changes from the original first AMF to the second AMF that currently serves the terminal device. Because the first AMF has stored the context of the terminal device, the second AMF may request the context of the terminal device from the first AMF.

The context of the terminal device may be understood as a parameter that is related to the terminal device and that is used for associating terminal devices or for associating the terminal device with each network function entity. For example, the parameter may be a set of interface parameters.

S205. The first AMF feeds back the context of the terminal device to the second AMF.

The context of the terminal device may further include identifier information of a PCF (denoted as a first PCF for ease of distinguishing and understanding) that establishes an AM policy association with the first AMF.

S206. If the second AMF has not obtained a subscription permanent identifier (SUPI) from the terminal device or the first AMF, the second AMF sends, to the terminal device, request information used to request a subscription concealed identifier (SUCI).

S207. The terminal device sends, to the second AMF, response information used to indicate the SUCI.

S208. The second AMF selects an AUSF.

S209. The AUSF performs authentication on the terminal device.

S210. The second AMF sends, to the first AMF, information that is used to indicate that the second AMF has received the context of the terminal device.

S211. If the second AMF has not obtained a permanent equipment identifier (PEI) from the terminal device or the first AMF, the second AMF sends, to the terminal device, information used to request the PEI.

S212. The second AMF initiates mobile equipment (ME) identifier authentication.

S213. The second AMF selects UDM.

S214. The second AMF registers with the selected UDM and obtains subscription information.

S215. The UDM instructs the first AMF to delete the context of the terminal device.

S216. The second AMF selects a PCF (for example, a second PCF) that can serve the terminal device.

Herein, the second AMF needs to consider a geographical location of the terminal device when selecting a PCF.

Specifically, in a non-roaming scenario, that is, the terminal device is located in a home or home public land mobile network (H-PLMN) network, and the AMF needs to select only one H-PCF located in the H-PLMN. In a roaming scenario, that is, the terminal device is located in a visited or visited PLMN (V-PLMN) network, and the AMF needs to select two PCFs. One PCF is a V-PCF located in the V-PLMN, and the other PCF is an H-PCF located in the H-PLMN.

It should be noted that the second PCF selected by the second AMF may be the first PCF that previously establishes the AM policy association with the first AMF, or may be a PCF that is different from the first PCF.

S217. The second AMF and the second PCF establish an AM policy association.

Figure 3:
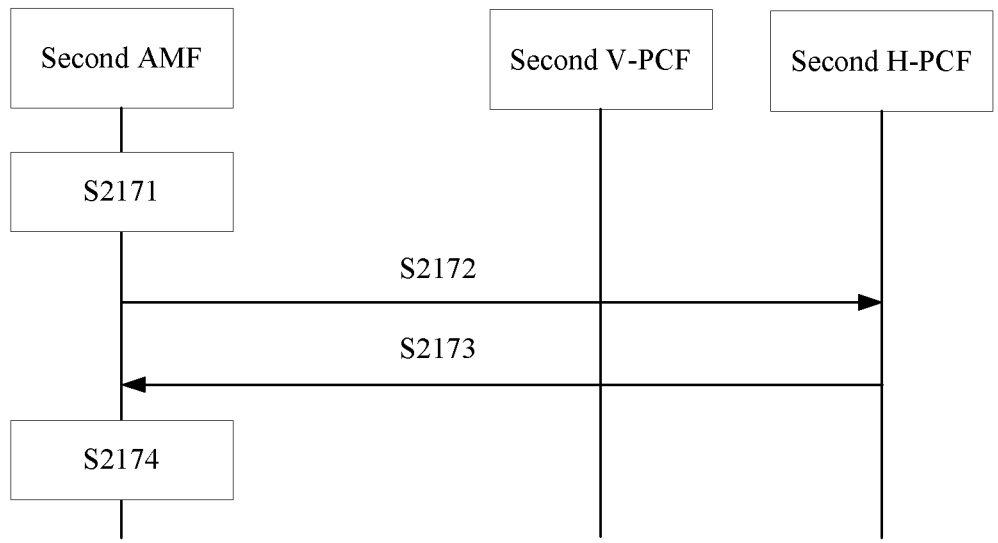
FIG. 3 is a schematic flowchart of establishing an AM policy association by an AMF and a PCF according to an embodiment of this application.

FIG. 3 is a schematic flowchart of establishing an AM policy association by an AMF and a PCF. As shown in FIG. 3, S2171. The second AMF determines to establish the AM policy association with the second PCF.

S2172. The second AMF sends, to the second PCF, association request information used to request to establish the AM policy association with the second PCF.

S2173. The second PCF sends an AM policy to the second AMF.

Herein, the AM policy includes access and mobility related policy information and UE access selection and packet data unit (PDU) session selection related policy information. The UE access selection and PDU session selection related policy information includes an access network discovery and selection policy (ANDSP) and a UE route selection policy (URSP).

S2174. The second AMF deploys the AM policy, or the second AMF deploys the AM policy and the context of the terminal device. The second AMF stores access and mobility related policy information in the AM policy, and sends UE access selection and PDU session selection related policy information to the terminal device.

As described above, if a type of the PCF selected by the AMF varies with the geographical location of the terminal device, the AMF and the PCF may establish a policy association between the AMF and the PCF for the terminal device based on the type of the PCF. The second PCF may be at least one of a second V-PCF or a second H-PCF.

If the terminal device is in the non-roaming scenario, because the second AMF needs to select only one H-PCF located in the H-PLMN, the second AMF needs to establish only an AM policy association between the second AMF and the second H-PCF.

If the terminal device is in the roaming scenario, because the AMF needs to select one H-PCF located in the H-PLMN and one V-PCF located in the V-PLMN, in a possible implementation, in S2172, the second AMF sends the association request information to the second V-PCF, and the second V-PCF sends the association request information to the second H-PCF. In S2173, the second H-PCF sends an AM policy in the second H-PCF for the terminal device to the second V-PCF, and the second V-PCF may perform related processing on an AM policy in the second V-PCF for the terminal device and the AM policy in the second H-PCF for the terminal device, and send the processed AM policy for the terminal device to the AMF, so that the AMF deploys the AM policy.

It should be noted that if the second PCF selected by the second AMF is the first PCF previously associated with the first AMF, that is, the first PCF is reused, the second AMF may deploy only the AM policy. If the second PCF selected by the second AMF is different from the first PCF, that is, the first PCF is not reused, the second AMF needs to deploy the AM policy and the context of the terminal device.

S218. The second AMF sends a session management context update request to an SMF, so as to activate a protocol data unit (PDU) session.

S219. If the first AMF has not sent, to the second AMF in S205, an identifier of a first PCF associated with the first AMF, the first AMF sends, to the first PCF, deletion request information that is used to request to delete an AM policy association, so that the first PCF deletes AM policy control information stored in the first PCF for the terminal device.

Figure 4:
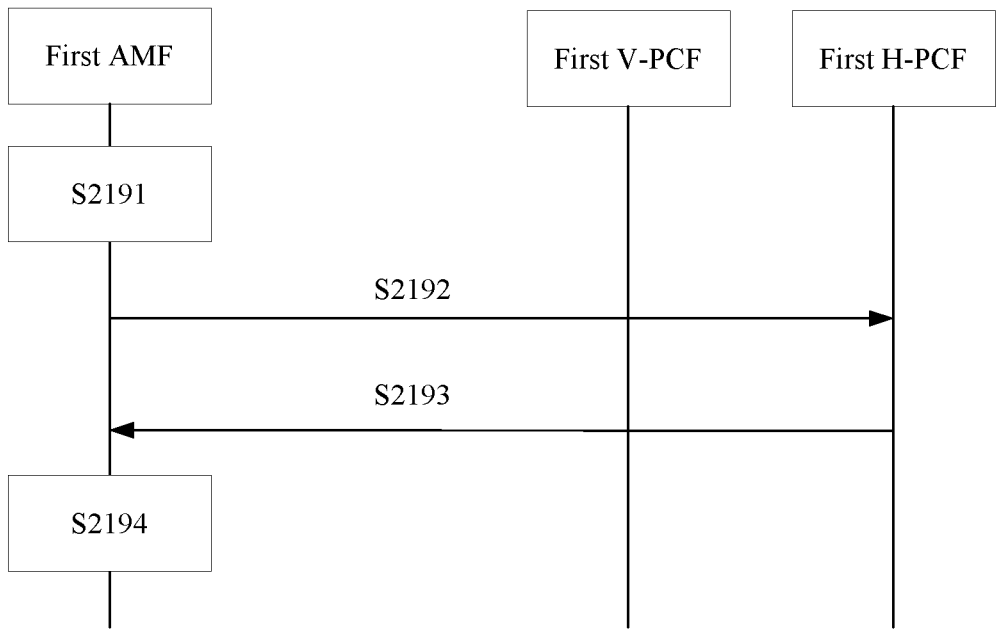
FIG. 4 is a schematic flowchart of deleting an AM policy association by an AMF and a PCF according to an embodiment of this application.

Specifically, FIG. 4 is a schematic flowchart of deleting an AM policy association by an AMF and a PCF. As shown in FIG. 4, S2191. The first AMF determines to terminate or delete the AM policy association.

S2192. The first AMF sends, to the first PCF, the deletion request information that is used to request to delete the AM policy association for the terminal device, where the deletion request information includes an identifier of the terminal device.

S2193. The first PCF deletes the AM policy control information stored in the first PCF for the terminal device, and sends response information to the first AMF, so as to notify the first AMF that a deletion operation for the AM policy has been completed.

The AM policy control information stored in the first PCF for the terminal device includes at least the identifier of the terminal device, the AM policy, and a corresponding identifier of the AM policy.

S2194. The first AMF deletes AM policy control information stored in the first AMF for the terminal device.

The AM policy control information stored in the first AMF for the terminal device includes at least the identifier of the first PCF and the AM policy. Optionally, the first AMF may further delete event subscription that is detected by the first AMF and that is requested by the AM policy association.

It should be understood that the first PCF may be any one of a first V-PCF or a first H-PCF.

In the roaming scenario, if only the first H-PCF is reused and the first V-PCF is not reused, the first AMF sends the deletion request information to the first V-PCF, so that the first V-PCF deletes AM policy control information for the terminal device, and the first H-PCF does not need to delete AM policy control information for the terminal device. In this case, the first PCF is the V-PCF. If neither the H-PCF nor the V-PCF is reused, the first AMF sends the deletion request information to the first V-PCF, and sends the deletion request information to the first H-PCF by using the first V-PCF, so that both the first H-PCF and the first V-PCF delete AM policy control information for the terminal device. In this case, the first PCF is any one of the first V-PCF or the first H-PCF. In the non-roaming scenario, the first PCF is only the first H-PCF.

It should be noted that if the deletion request information of the first AMF may be requesting the first H-PCF to delete an AM policy association for the terminal device, sending the deletion request information by the first AMF to the first H-PCF may be construed as sending the deletion request information by the first AMF to the first H-PCF by using the first V-PCF.

S220. The second AMF sends, to the terminal device, information that is used to indicate that the registration request of the terminal device has been accepted.

S221. The terminal device sends, to the second AMF, information that is used to indicate that the registration has been completed.

It may be learned from the description of the foregoing registration procedure and the background that if the first AMF sends the identifier of the first PCF to the second AMF, but actually, the PCF selected by the second AMF is not the first PCF that establishes the AM policy association with the first AMF, but is the second PCF that is different from the first PCF; in this case, the AM policy association between the first AMF and the first PCF cannot be deleted, and system resources are wasted.

Therefore, an embodiment of this application provides an access and mobility management policy association termination method. This helps resolve the foregoing problem.

The following describes in detail embodiments of this application with reference to FIG. 5 to FIG. 14.

In the embodiments of this application, a second AMF is an AMF that currently serves the terminal device, a second PCF is a PCF that currently serves the terminal device, and an AM policy association is established between the second PCF and the second AMF. A first AMF is an AMF that serves the terminal device before the second AMF serves the terminal device, a first PCF is a PCF that serves the terminal device before the second PCF serves the terminal device, and an AM policy association is established between the first PCF and the first AMF.

In other words, the first AMF, the second AMF, the first PCF, and the second PCF are all network elements that serve the terminal device. Due to movement of the terminal device or for other reasons, an AMF that serves the terminal device changes from the first AMF to the second AMF. Correspondingly, a PCF that serves the terminal device changes from the first PCF to the second PCF.

Figure 2:
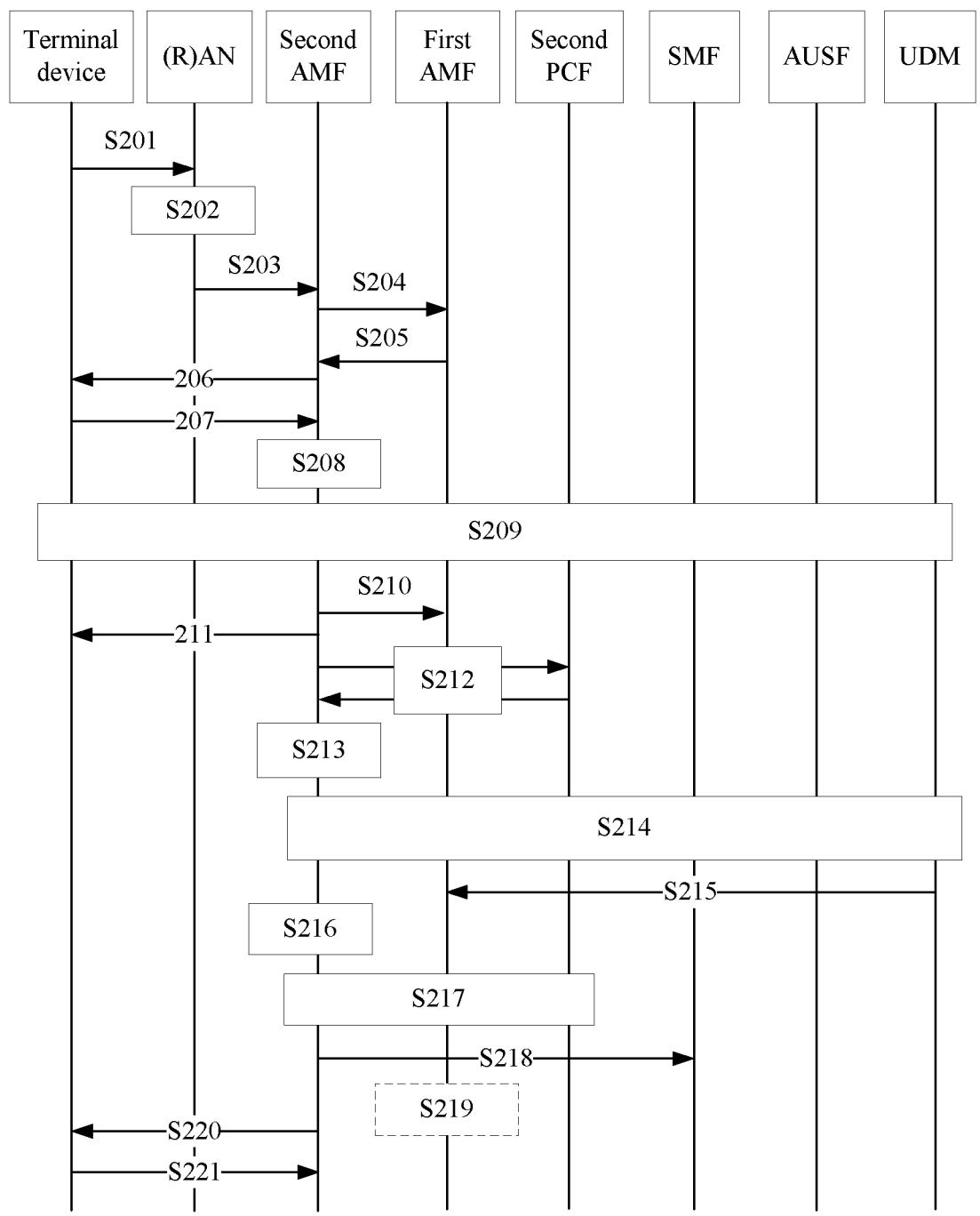
FIG. 2 is a schematic flowchart of a registration procedure according to an embodiment of this application.

In addition, the first AMF may be corresponding to the first AMF in FIG. 2, the second AMF is corresponding to the second AMF in FIG. 2, the first PCF may be corresponding to the first PCF in FIG. 2, and the second PCF is corresponding to the second PCF in FIG. 2.

Figure 5:
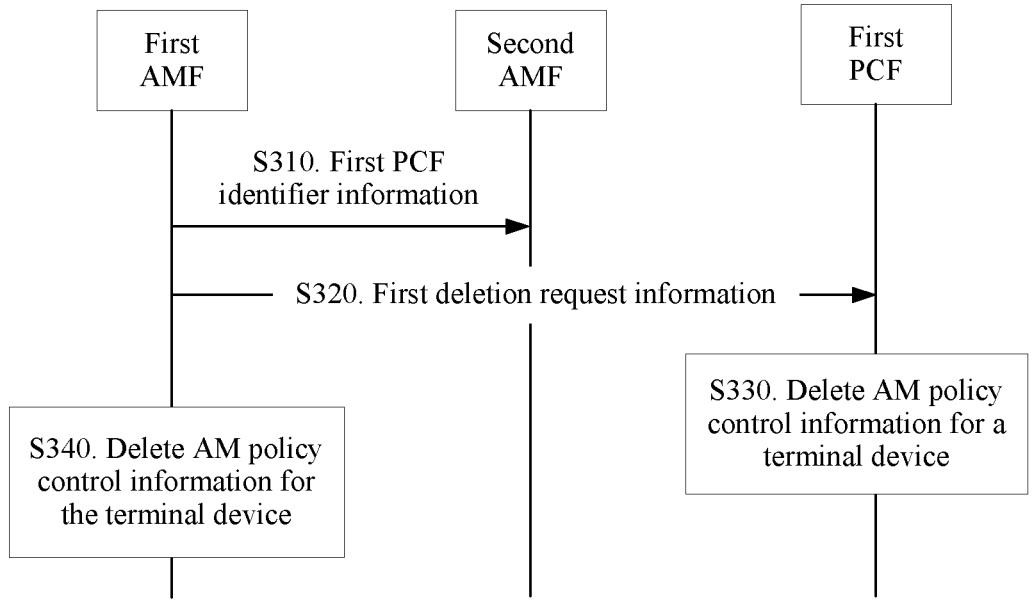
FIG. 5 is a schematic interaction diagram of an access and mobility management policy association termination method according to an embodiment of this application.

FIG. 5 is a schematic interaction diagram of an access and mobility management policy association termination method 300 according to an embodiment of this application. The following describes each step in the method 300 in detail with reference to FIG. 5 and FIG. 2.

In S310, a first AMF sends first PCF identifier information of a first PCF to a second AMF.

Specifically, S310 may be corresponding to S205 in FIG. 2, and the first PCF identifier information may be carried in the context of the terminal device. The first AMF that previously serves the terminal device sends the first PCF identifier information to the second AMF that currently serves the terminal device, so that the second AMF may select the first PCF when selecting a PCF, so that the first PCF can be reused.

In S320, the first AMF sends first deletion request information to the first PCF, where the first deletion request information is used to request the first PCF to delete an AM policy association between the first PCF and the first AMF for the terminal device, and the first PCF is different from a second PCF.

Specifically, when the first AMF determines that the second AMF has not selected the first PCF (that is, the first PCF is different from the second PCF), the first AMF sends the first deletion request information to the first PCF, so as to instruct the first PCF to delete the AM policy association between the first PCF and the first AMF fr the terminal device, or instruct the first PCF to terminate the AM policy association between the first PCF and the first AMF for the terminal device.

Therefore, in S330, the first PCF deletes AM policy control information for the terminal device. In S340, the first AMF deletes AM policy control information for the terminal device.

In other words, after receiving the first deletion request information sent by the first AMF, the first PCF deletes the AM policy control information stored in the first PCF for the terminal device. The AM policy control information stored in the first PCF for the terminal device includes at least an identifier of the terminal device, an AM policy, and a corresponding identifier of the AM policy.

After sending the first deletion request information, the first AMF also deletes the AM policy control information stored in the first AMF. The AM policy control information in the first AMF includes at least an identifier of the first PCF and the AM policy. Optionally, the first AMF may further delete event subscription that is detected by the first AMF and that is requested by the AM policy association.

In a possible implementation, the first deletion request information includes the identifier of the terminal device.

The following further describes the first PCF when the terminal device is in a roaming scenario and a non-roaming scenario.

If the terminal device is in the non-roaming scenario, the first PCF is a first H-PCF.

If the terminal device is in the roaming scenario, the first PCF may be any one of the first H-PCF or a first V-PCF. When the first AMF considers that the second AMF can reuse both the first H-PCF and the first V-PCF, the first AMF may send an identifier of the first H-PCF and an identifier of the first V-PCF to the second AMF, and the first AMF finally sends a first deletion request information to a PCF (at least one of the V-PCF or the H-PCF) that is not reused.

If the first V-PCF is not reused, the first AMF sends the first deletion request information to the first V-PCF. In this case, the first PCF is the first V-PCF. However, the first AMF may send the identifier of the first H-PCF and the identifier of the first V-PCF to the second AMF, or the first AMF may send only the identifier of the first V-PCF to the second AMF. This embodiment of this application is not limited thereto.

If neither the first V-PCF nor the first H-PCF is reused, the first AMF sends the first deletion request information to the first V-PCF, and sends the first deletion request information to the first H-PCF by using the first V-PCF, so that both the first H-PCF and the first V-PCF delete AM policy control information for the terminal device. In this case, the first PCF is any one of the first V-PCF or the first H-PCF. The first AMF may send the identifier of the first H-PCF and the identifier of the first V-PCF to the second AMF. Finally, because neither the first H-PCF nor the first V-PCF is reused, the first AMF sends the first deletion request information to the first V-PCF. For the first H-PCF, the first AMF sends the first deletion request information to the first H-PCF by using the first V-PCF.

Therefore, according to the access and mobility management policy association termination method provided in this embodiment of this application, when the second PCF selected by the second AMF is different from the first PCF, the first AMF sends, to the first PCF, the first deletion request information that is used to instruct the first PCF to delete the AM policy association, so that the first PCF may delete the corresponding AM policy control information, thereby effectively saving system resources.

In S320, the first AMF may determine, in the following two manners (namely, Manner 1 and Manner 2), whether the first PCF is the same as the second PCF. The following separately describes Manner 1 and Manner 2.

Manner 1

If the first AMF has not received, within preset duration, second deletion request information sent by the first PCF, the first AMF sends the first deletion request information to the second AMF, where the second deletion request information is used to request the first AMF to delete the AM policy control information between the first PCF and the first AMF for the terminal device.

In this embodiment of this application, to save system resources, deletion request information (for example, the first deletion request information) can be sent to the first PCF by the first AMF, and deletion request information (for example, the second deletion request information) can also be sent to the first AMF by the first PCF. A difference is as follows: The first AMF sends the first deletion request information to the first PCF when the first PCF is different from the second PCF, so that the first PCF deletes the AM policy control information in the first PCF for the terminal device, and the first PCF sends the second deletion request information to the first AMF when the first PCF is the same as the second PCF, so that only the first AMF deletes the AM policy control information in the first AMF for the terminal device. However, because the first PCF is reused, the first PCF keeps the AM policy control information in the first PCF for the terminal device.

Therefore, if the first AMF has not received, within the preset duration, the deletion request information sent by the first PCF, it indicates that the first PCF is different from the second PCF, and the first AMF may send the first deletion request information to the first PCF.

In addition, because it needs to be determined whether the first PCF is the same as the second PCF, and the second AMF needs to complete a process of selecting a PCF, the preset duration is greater than or equal to duration within which the second AMF selects a PCF.

In a specific implementation process, the first AMF may start a timer at any possible time point to set the preset duration. For example, in the following, Manner 1A and Manner 1B are used to describe a time point at which the first AMF starts the timer.

Manner 1A

After the first AMF receives de-registration information sent by unified data management UDM, the first AMF starts the timer, where duration of the timer is the preset duration.

Referring to FIG. 2, the step of receiving, by the first AMF, a de-registration information sent by UDM may be corresponding to S215 in FIG. 2.

Because a time point at which the UDM sends the de-registration information to the first AMF is relatively close to a time point at which the second AMF selects a PCF, if the first AMF starts the timer after receiving the de-registration information, time may be saved.

Manner 1B

After the first AMF sends the first PCF identifier information to the second AMF, the first AMF starts the timer, and duration of the timer is the preset duration.

Still referring to FIG. 2, the step of sending, by the first AMF, the first PCF identifier information to the second AMF may be corresponding to S205 in FIG. 2.

By way of example, and not limitation, the first AMF may start the timer after the first AMF determines that the first AMF no longer serves the terminal device, to set preset duration, while the timer started at different time points is corresponding to different preset duration. For example, after receiving a message that is sent by the second AMF and that is used to request the context of the terminal device, the first AMF may start the timer. Preset duration corresponding to the started timer is greater than the preset duration corresponding to the timer in Manner 1A and Manner 1B.

Manner 2

Before the first AMF sends the first deletion request information to the first PCF, the first AMF may determine, by receiving information sent by the second AMF, whether the first PCF is the same as the second PCF.

For example, in the following, Manner 2A and Manner 2B are used to describe information received by the first AMF.

Manner 2A

The first AMF receives second PCF identifier information of the second PCF that is sent by the second AMF.

Figure 6:
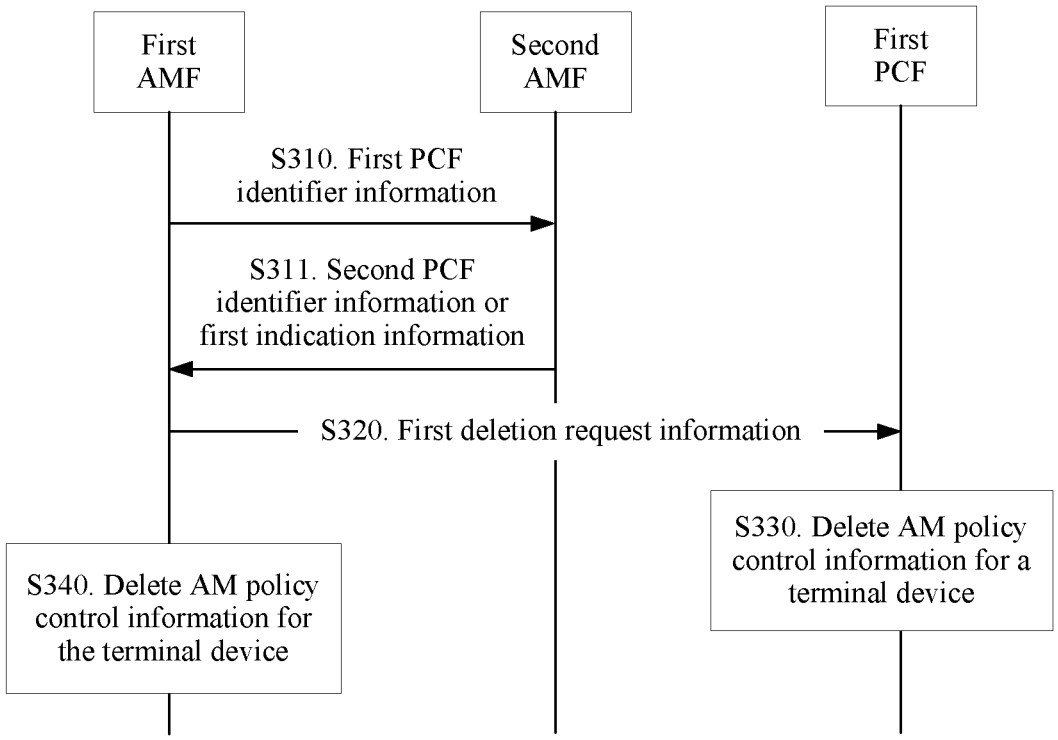
FIG. 6 is a schematic interaction diagram of an access and mobility management policy association termination method according to another embodiment of this application.

As shown in FIG. 6, after S310, in S311, the first AMF receives the second PCF identifier information sent by the second AMF. To be specific, the first deletion request information may be sent to the first PCF only if the following case occurs: The second AMF completes a process of selecting a PCF, and an identifier of the selected PCF (for example, the second PCF) may be sent to the first AMF, so that the first AMF may compare the received identifier of the second PCF with the identifier of the first PCF that has been determined by the first AMF, and if the identifier of the first PCF is different from the identifier of the second PCF, it indicates that the first PCF is not reused.

Manner 2B

The first AMF receives first indication information sent by the second AMF, where the first indication information is used to indicate that the first PCF is different from the second PCF.

Still as shown in FIG. 6, after S310, in S311, the first AMF receives the first indication information sent by the second AMF.

Similarly, the first deletion request information may be sent to the first PCF only if the following case occurs: A PCF that establishes an AM policy association with the second AMF can be determined only if the second AMF completes a process of selecting a PCF. The second AMF compares an identifier of the second PCF with the identifier of the first PCF that is carried in the context of the terminal device sent from the first AMF, and sends a comparison result (for example, the first indication information) to the first AMF. Alternatively, the first AMF sends the first indication information only when the first PCF is different from the second PCF, so that after receiving the first indication information, the first AMF can determine whether the first PCF is the same as the second PCF. When the first PCF is different from the second PCF, it indicates that the first PCF is not reused.

The foregoing describes this embodiment of this application in detail with reference to FIG. 5 and FIG. 6. The following describes an embodiment of this application in detail with reference to FIG. 7 to FIG. 9 by using a specific registration process.

Figure 7:
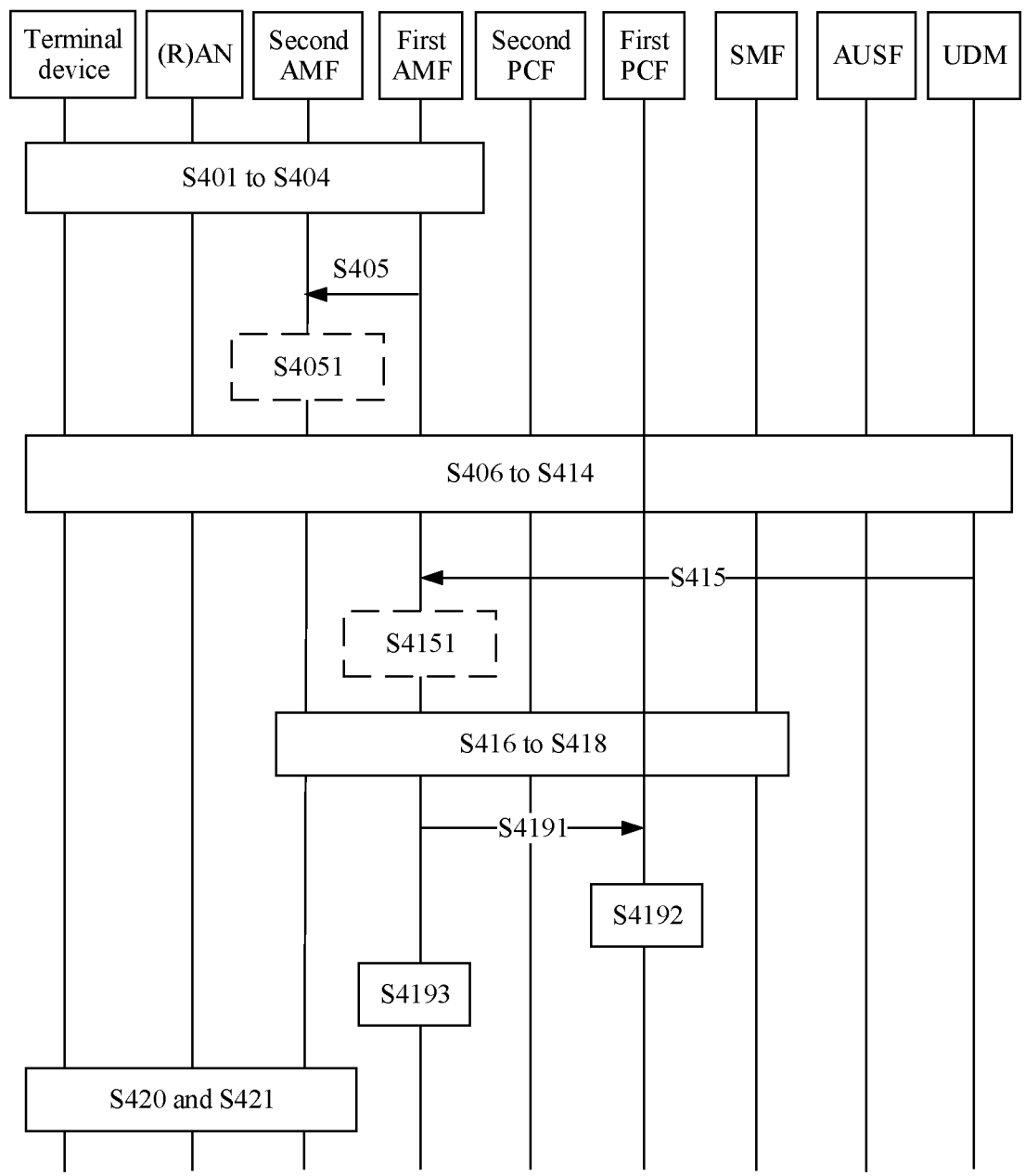
FIG. 7 to FIG. 9 each are a schematic flowchart of a registration procedure according to another embodiment of this application.

FIG. 7 is another schematic flowchart of a registration process according to an embodiment of this application. The following describes each step.

S401 to S404 may be respectively corresponding to S201 to S204 in FIG. 2. To avoid repetition, refer to the descriptions of S201 to S204 in FIG. 2.

S405. The first AMF sends the context of the terminal device to the second AMF, where the context of the terminal device includes first PCF identifier information.

S4051. The first AMF starts a timer.

S406 to S414 may be respectively corresponding to S206 to S214 in FIG. 2. To avoid repetition, refer to the descriptions of S206 to S214 in FIG. 2.

S415. The UDM sends de-registration information to the first AMF.

S4151. The first AMF starts a timer.

It should be noted that S4051 and S4151 are two either-or steps, in other words, the first AMF either performs S4051 or performs S4151.

S416 to S418 may be respectively corresponding to S216 to S218 in FIG. 2. To avoid repetition, refer to the descriptions of S216 to S218 in FIG. 2.

S4191 to S4193 may be respectively corresponding to S320 to S340 in FIG. 5. To avoid repetition, refer to the descriptions of S320 to S340 in FIG. 5.

S420 and S421 may be respectively corresponding to S220 and S221 in FIG. 2. To avoid repetition, refer to the descriptions of S220 and S221 in FIG. 2.

Figure 8:
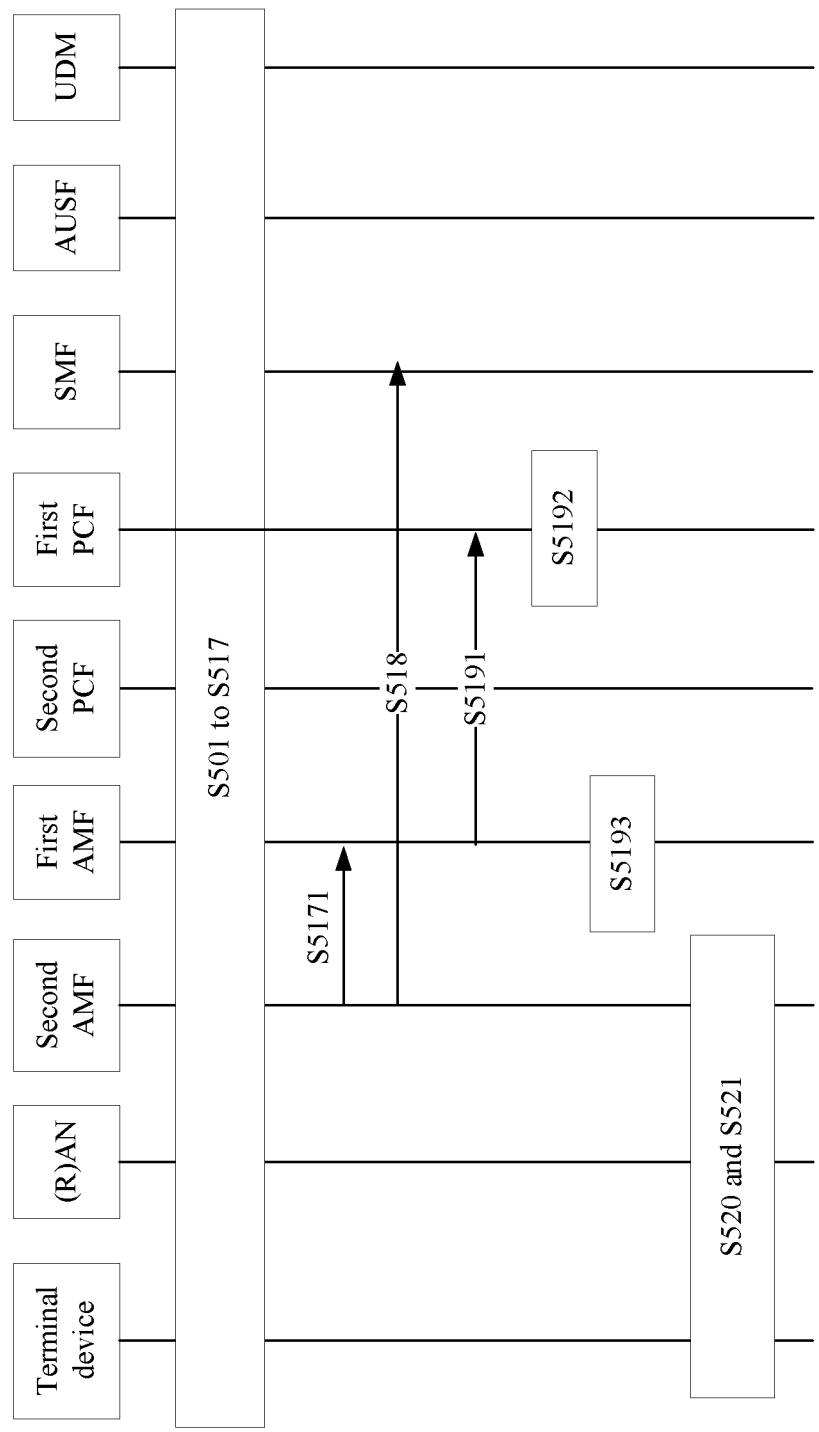

FIG. 8 is another schematic flowchart of a registration process according to an embodiment of this application. The following describes each step.

S501 to S517 may be respectively corresponding to S201 to S217 in FIG. 2. To avoid repetition, refer to the descriptions of S201 to S217 in FIG. 2.

S5171. After selecting the second PCF, the second AMF sends second PCF identifier information or first indication information to the first AMF.

S518 may be corresponding to S218 in FIG. 2. To avoid repetition, refer to the description of S218 in FIG. 2.

S5191 to S5193 may be respectively corresponding to S320 to S340 in FIG. 5. To avoid repetition, refer to the descriptions of S320 to S340 in FIG. 5.

S520 and S521 may be respectively corresponding to S220 and S221 in FIG. 2. To avoid repetition, refer to the descriptions of S220 and S221 in FIG. 2.

Figure 9:
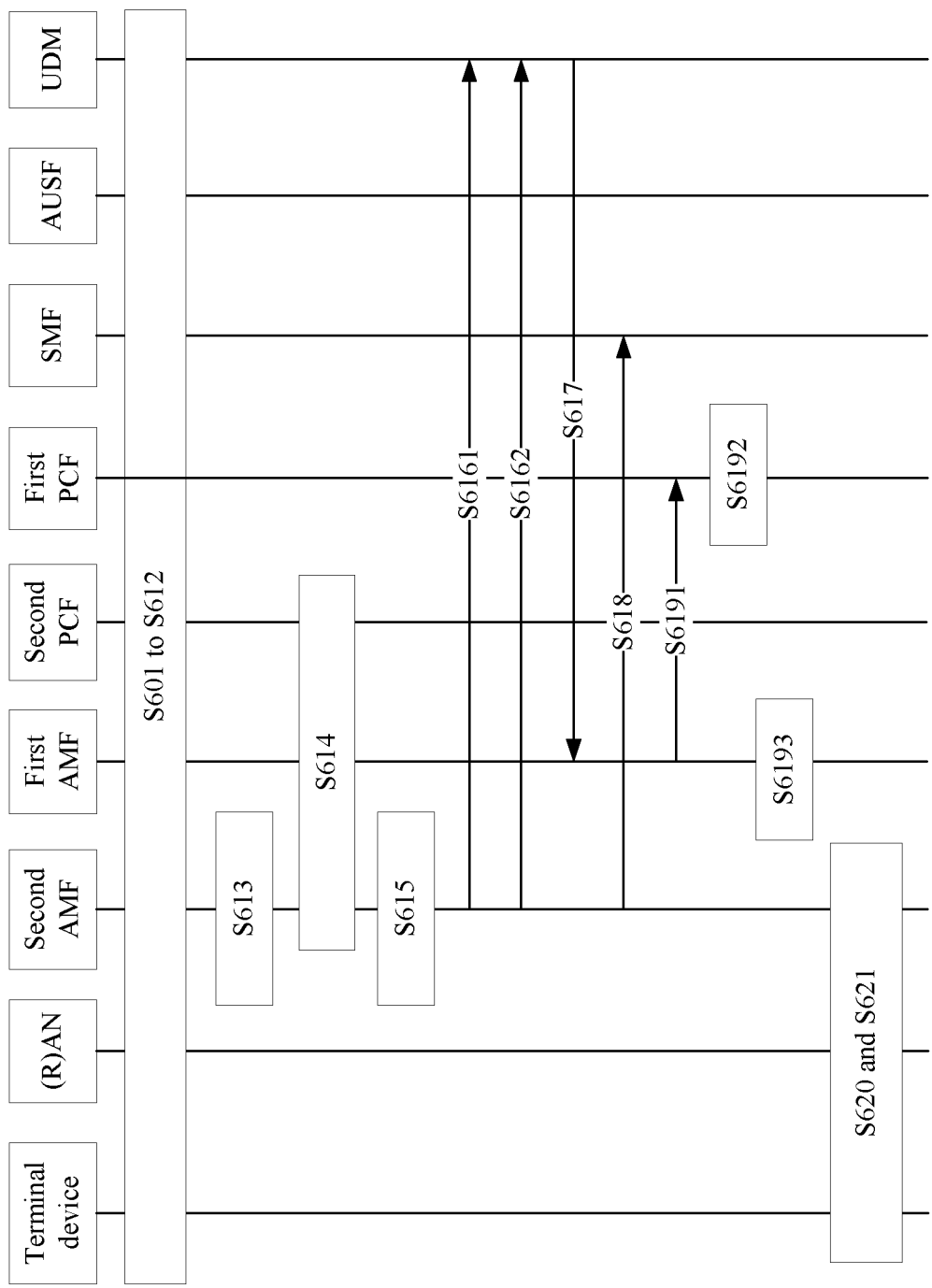

FIG. 9 is still another schematic flowchart of a registration process according to an embodiment of this application. The following describes each step.

S601 to S612 may be respectively corresponding to S201 to S212 in FIG. 2. To avoid repetition, refer to the descriptions of S201 to S212 in FIG. 2.

S613 may be corresponding to S216 in FIG. 2, S614 may be corresponding to S217 in FIG. 2, and S615 may be corresponding to S213 in FIG. 2. To avoid repetition, refer to the descriptions of S216, S217, and S213 in FIG. 2.

S6161. The second AMF sends registration information to the UDM, where the registration information includes second PCF identifier information or first indication information.

S6162. The second AMF sends, to the UDM, request information used to request to return AM subscription data, SMF selection subscription data, and the context of the terminal device, where the request information includes the second PCF identifier information or the first indication information.

S617. The UDM sends, to the first AMF, information used to instruct the first AMF to delete the context of the terminal device, where the information includes the second PCF identifier information or the first indication information that is obtained by the UDM from S6161 or S6162.

S618 may be corresponding to S218 in FIG. 2. To avoid repetition, refer to the description of S218 in FIG. 2.

S6191 to S6193 may be respectively corresponding to S320 to S340 in FIG. 5. To avoid repetition, refer to the descriptions of S320 to S340 in FIG. 5.

S620 and S621 may be respectively corresponding to S220 and S221 in FIG. 2. To avoid repetition, refer to the descriptions of S220 and S221 in FIG. 2.

The foregoing describes the access and mobility management policy association termination method according to the embodiments of this application with reference to FIG. 5 to FIG. 9. The following describes an access and mobility management policy association termination method according to another embodiment of this application with reference to FIG. 10.

Similarly, the following explanations for a first AMF, a second AMF, a first PCF, and a second PCF are the same as those for the first AMF, the second AMF, the first PCF, and the second PCF in the method 300. For brevity, details are not described herein again.

Figure 10:
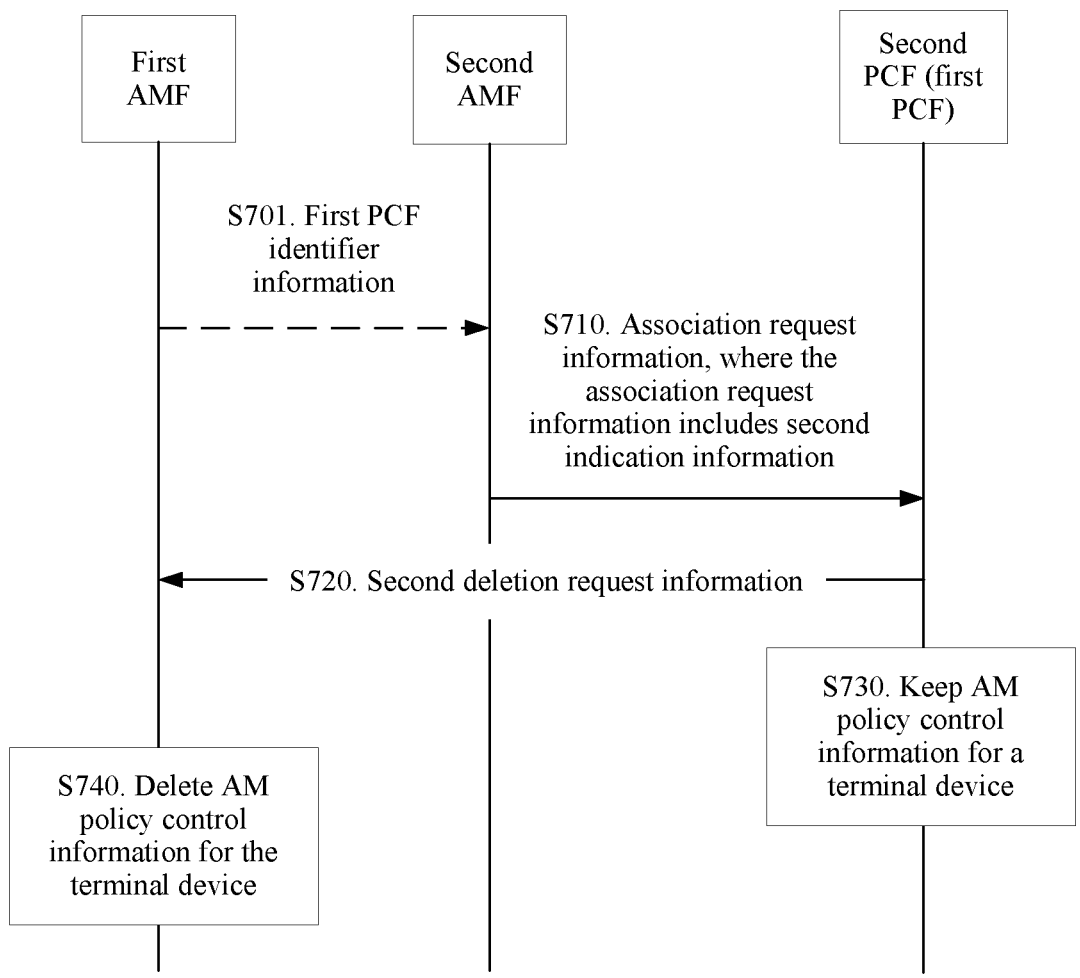
FIG. 10 is a schematic interaction diagram of an access and mobility management policy association termination method according to another embodiment of this application.

FIG. 10 is a schematic interaction diagram of an access and mobility management policy association termination method 700 according to another embodiment of this application. The following describes each step in the method 700 in detail.

In S701, a first AMF sends, to a second AMF, first PCF identifier information used to identify a first PCF.

Herein, S701 may be corresponding to S205 in FIG. 2. For a specific description, refer to the description of S205.

In S710, the second AMF sends association request information to a second PCF, where the association request information is used to request to establish an AM policy association with the second PCF for a terminal device, and the association request information further includes second indication information used to determine whether the second PCF is the same as the first PCF.

In other words, in a process of establishing the AM policy association with the selected second PCF, the second AMF may send, to the second PCF by using the association request information, the second indication information received from the first AMF.

The second indication information may be directly used to indicate whether the first PCF is the same as the second PCF. For example, "1" indicates "the same", and "0" indicates "different". In this case, the second AMF may determine, by comparing the identifier information of the first PCF obtained in S701 with an identifier of the second PCF selected by the second AMF, whether the first PCF is the same as the second PCF, so as to send the generated second indication information to the second PCF, so that the second PCF determines whether the second PCF is reused.

Alternatively, the second indication information may include the first PCF identifier information of the first PCF, and in this case, the second AMF may send, to the second PCF as the second indication information, the first PCF identifier information received in S701, so that the second PCF may compare the identifier of the first PCF with an identifier of the second PCF, to determine whether the first PCF is the same as the second PCF.

In S720, the second PCF sends second deletion request information to the first AMF according to the second indication information, where the second deletion request information is used to request the first AMF to delete AM policy control information between the first PCF and the first AMF for the terminal device.

To be specific, the second PCF determines, according to the second indication information, whether the first PCF is the same as the second PCF, so as to determine whether to send the deletion request information to the first AMF.

The following separately describes sending the second deletion request information and skipping sending the second deletion request information.

In S720, when the first PCF is the same as the second PCF, the second PCF sends the second deletion request information to the first AMF.

In addition, in S730, the second PCF keeps AM policy control information for the terminal device.

In S740, the first AMF deletes the AM policy control information for the terminal device.

To be specific, if the second PCF determines, according to the second indication information, that the first PCF is the same as the second PCF, it indicates that the first PCF is reused, and the second PCF is the first PCF. In this case, the first PCF (or the second PCF) sends the second deletion request information to the first AMF. However, the first PCF keeps the AM policy control information stored in the first PCF for the terminal device, so as to reuse the AM policy control information for the terminal device. After receiving the second deletion request information, the first AMF determines that there is no longer an AM policy association between the first AMF and the first PCF. Therefore, the AM policy control information stored in the first AMF is deleted.

The following further describes related steps of the first PCF when the terminal device is in a roaming scenario.

In the roaming scenario, the first PCF may be any one of a first V-PCF or a first H-PCF.

If only the first H-PCF is reused and the first V-PCF is not reused, the first H-PCF sends deletion request information by using the first V-PCF, the first H-PCF keeps AM policy control information for the terminal device, and the first PCF is the first H-PCF.

If both the first H-PCF and the first V-PCF are reused, only the first V-PCF needs to send deletion request information, and the first PCF is the first V-PCF.

If only the first V-PCF is reused and the first H-PCF is not reused, the first V-PCF not only sends the second deletion request information to the first AMF, but also needs to send deletion request information to the first H-PCF, so that the first H-PCF deletes AM policy control information stored in the first H-PCF for the terminal device.

In another case, if the first PCF is different from the second PCF, the second PCF does not send the second deletion request information to the first AMF.

In other words, the second PCF is not a reused PCF, and may not need to send the second deletion request information to the first AMF.

Therefore, according to the access and mobility management policy association termination method provided in this embodiment of this application, the second PCF that has established the AM policy association with the second AMF receives the second indication information that is sent by the second AMF and that is used to determine whether the first PCF that has established the AM policy association with the first AMF is the same as the second PCF, where the first AMF is an AMF that serves the terminal device before the second AMF serves the terminal device, and the second PCF sends the deletion request information according to the second indication information, so that the second AMF may delete the AM policy control information for the terminal device, and system resources are also saved.

Embodiments of this application further provide an access and mobility management policy association termination method. The following describes a method provided in still another embodiment of this application with reference to FIG. 11 to FIG. 14.

First, for ease of understanding, solutions and ideas of a method 800 and a method 1000 are first simply described.

An AMF that establishes an AM policy association with a PCF may send an identifier of the AMF to the PCF in an AM policy association establishment process, and the PCF stores the identifier of the AMF. If a new AMF subsequently needs to establish an AM policy association with a PCF, the PCF replaces the previously received identifier of the AMF. In addition, after preset duration, the AMF may send deletion request information that includes an identifier of the AMF to the PCF. In this way, the PCF may further determine, by determining whether the identifiers of the AMFs received previously and subsequently are the same, whether the PCF is reused: If the identifiers of the AMFs received previously and subsequently by the PCFs are the same, it indicates that the PCF is reused, and the PCF keeps AM policy control information stored in the PCF for the terminal device; or if the identifiers of the AMFs received previously and subsequently by the PCFs are different, it indicates that the PCF is not reused, and the PCF deletes AM policy control information stored in the PCF for the terminal device.

In the method 800, a technical solution of a case in which a PCF is reused is described, and in the method 1000, a technical solution of a case in which a PCF is not reused is described.

The following separately describes the method 800 and the method 1000.

In the method 800, a fourth AMF is an AMF that currently serves the terminal device, a third PCF is a PCF that currently serves the terminal device, and an AM policy association is established between the third PCF and the fourth AMF. A third AMF is an AMF that serves the terminal device before the fourth AMF serves the terminal device. In addition, in a process in which the third AMF serves the terminal device, an AM policy association is also established between the third PCF and the third AMF.

Figure 11:
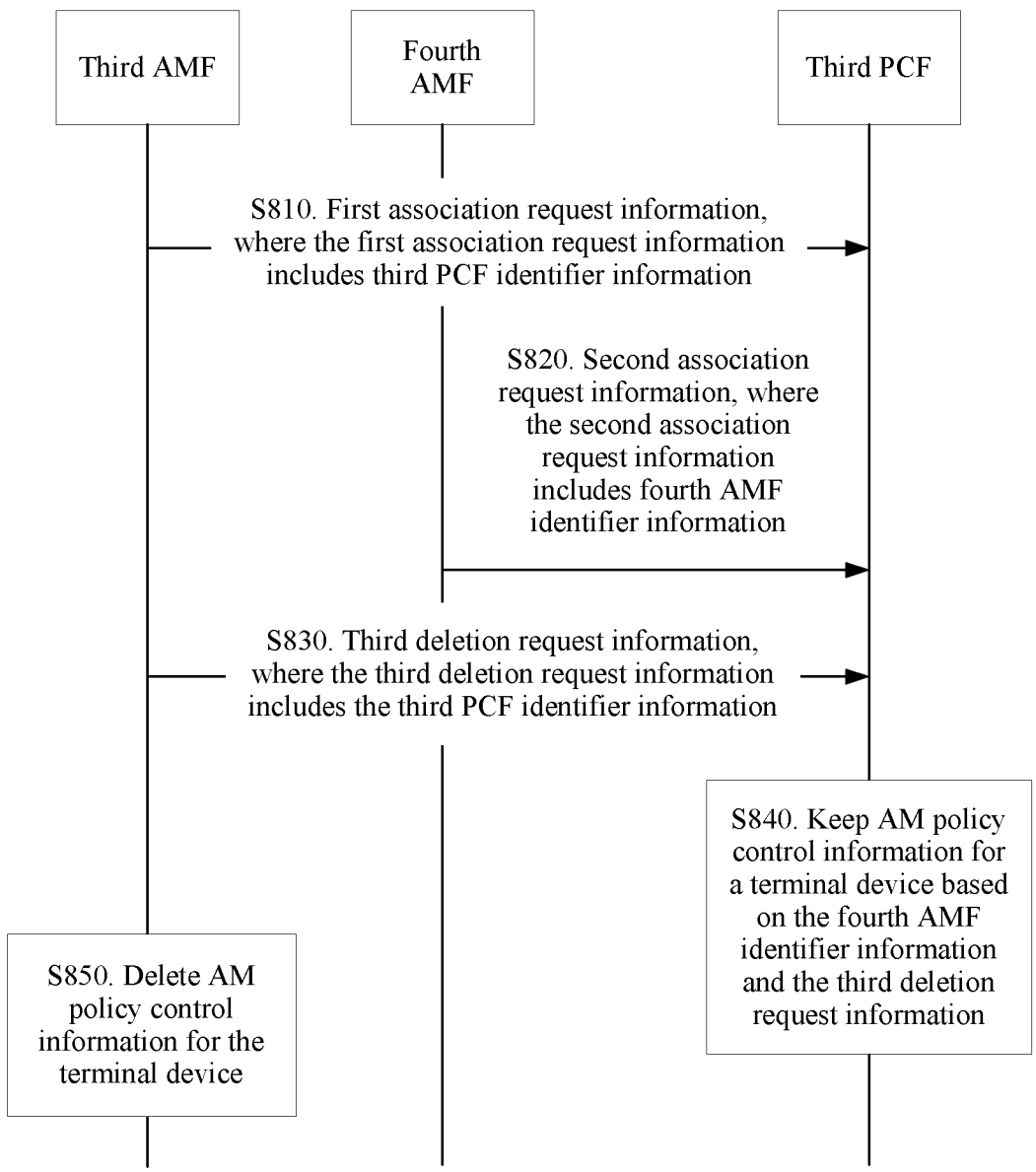
FIG. 11 is a schematic interaction diagram of an access and mobility management policy association termination method according to another embodiment of this application.

FIG. 11 is a schematic interaction diagram of an access and mobility management policy association termination method 800 according to another embodiment of this application.

S810. A third AMF sends, to a third PCF, first association request information used to request to establish an AM policy association with the third PCF for a terminal device, where the first association request information further includes third AMF identifier information used to indicate the third AMF.

To be specific, in a process in which the third AMF and the third PCF establish the AM policy association, an identifier of the third AMF is added to the first association request information.

S820. A fourth AMF sends, to the third PCF, second association request information used to request to establish an AM policy association with the third PCF for the terminal device, where the second association request information further includes fourth AMF identifier information used to indicate the fourth AMF.

When an AMF that previously serves the terminal device changes from the third AMF to the fourth AMF due to movement of the terminal device or for other reasons, the fourth AMF needs to establish the AM policy association with the third PCF. Similarly, when sending the second association request information to the third PCF, the fourth AMF adds an identifier of the fourth AMF to the second association request information.

It should be noted that, when the third PCF previously and subsequently receives the identifiers of the AMFs in processes of establishing the policy associations with the AMFs, the identifier of the AMF received subsequently is used to replace the identifier of the AMF received previously. For example, the third PCF replaces the identifier of the third AMF stored in the third PCF with the identifier of the fourth AMF. In this way, it can be ensured that the third PCF can compare the recently received identifier of the AMF with the identifier of the AMF received in S830.

S830. After preset duration, the third AMF sends the third deletion request information to the third PCF, where the third deletion request information is used to request the third PCF to delete the AM policy association between the third PCF and the third AMF for the terminal device, and the third deletion request information further includes the third AMF identifier information.

Specifically, the third AMF sends the third deletion request information to the third PCF after the preset duration, where the preset duration is greater than or equal to duration within which the fourth AMF selects a PCF, so that after obtaining a latest identifier of an AMF (that is, the identifier of the fourth AMF) that establishes an AM policy association with the third PCF, the third PCF may effectively compare the stored latest identifier of the fourth AMF with the identifier of the third AMF in the third deletion request information.

In a possible implementation, after the third AMF receives de-registration information sent by unified data management UDM, the third AMF starts a timer, where duration of the timer is the preset duration.

Referring to FIG. 2, the step of receiving, by the third AMF, a de-registration information sent by UDM may be corresponding to S215 in FIG. 2.

Because a time point at which the UDM sends the de-registration information to the third AMF is relatively close to a time point at which the fourth AMF selects a PCF, if the third AMF starts the timer after receiving the de-registration information, time may be saved.

By way of example, and not limitation, after the third AMF sends third PCF identifier information to the fourth AMF, the third AMF may also start the timer, and duration of the timer is the preset duration.

Still referring to FIG. 2, the step of sending, by the third AMF, third PCF identifier information to the fourth AMF may be corresponding to S205 in FIG. 2.

S840. The third PCF does not delete AM policy control information for the terminal device based on the fourth AMF identifier information and the third deletion request information.

To be specific, the third PCF compares the fourth AMF with the third AMF. If it is determined that the two AMFs are different, it indicates that the third PCF has previously established the AM policy association with the third AMF that serves the terminal device, and currently also establishes the AM policy association with the fourth AMF that also serves the terminal device. This means that the third PCF is reused. Therefore, the third PCF does not delete the AM policy control information for the terminal device in the third PCF, and keeps the AM policy control information.

S850. The third AMF deletes AM policy control information for the terminal device.

Therefore, according to the access and mobility management policy association termination method provided in this embodiment of this application, each AMF (for example, the third AMF or the fourth AMF) that needs to establish an AM policy association with a PCF (for example, the third PCF) sends an identifier of the AMF to the third PCF in an AM policy association connection establishment process, and after preset duration, sends deletion request information that carries an identifier of the AMF. The third PCF compares the recent identifier (for example, the identifier of the fourth AMF) of the AMF that is received during establishment of the AM policy association and the identifier (for example, the identifier of the third AMF) of the AMF that is carried in the received deletion request information. When the two AMFs are different, the third PCF keeps the AM policy control information, and only the third AMF deletes the AM policy control information, so that the AM policy control information in the PCF is reused, and system resources are also saved.

Figure 12:
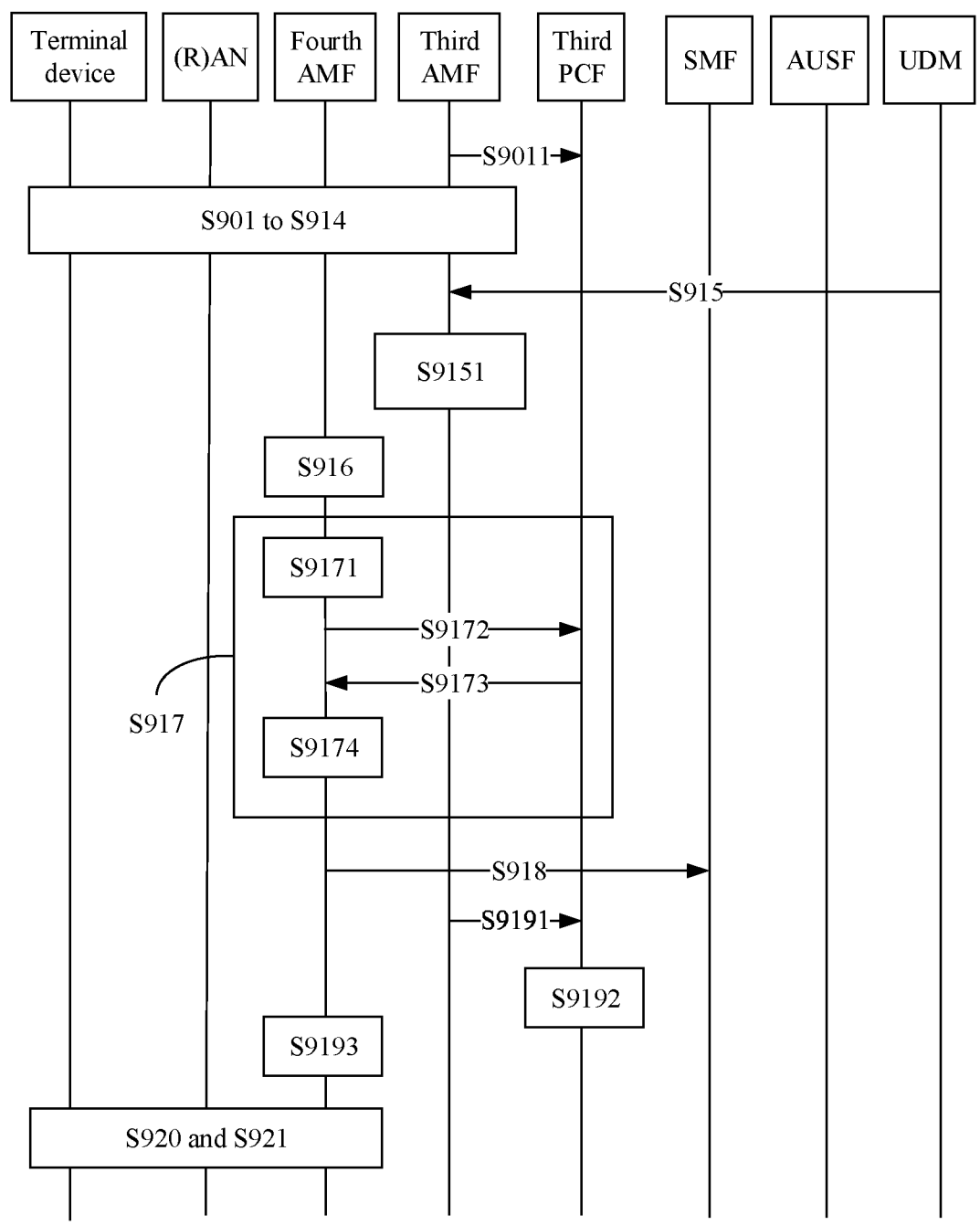
FIG. 12 is a schematic flowchart of a registration procedure according to another embodiment of this application.

The following describes in detail, with reference to FIG. 12 by using a specific registration process, an embodiment of a case in which a PCF is reused.

S9011. A third AMF sends first association request information to a third PCF when establishing an AM policy association with the third PCF, where the first association request information carries third AMF identifier information of the third AMF.

S901 to S914 may be respectively corresponding to S201 to S214 in FIG. 2. To avoid repetition, refer to the descriptions of S201 to S214 in FIG. 2.

S915. The UDM sends de-registration information to the third AMF.

S9151. The third AMF starts a timer.

S916. The fourth AMF selects a PCF. S916 may be corresponding to S216 in FIG. 2. To avoid repetition, refer to the description of S216 in FIG. 2.

S917. The fourth AMF establishes an AM policy association with the third PCF. S917 includes S9171 to S9174 that may be respectively corresponding to S2171 to S2174 in FIG. 3. In S9171, the fourth AMF sends second association request information to the third PCF, where the second association request information carries fourth AMF identifier information used to identify the fourth AMF.

S918 may be corresponding to S218 in FIG. 2.

S9191. The third AMF sends third deletion request information to the third PCF.

S9191 may be corresponding to S830 in FIG. 11. To avoid repetition, refer to the description of S830 in FIG. 11.

S9192. The third PCF keeps AM policy control information stored in the third PCF for the terminal device. S9192 may be corresponding to S840 in FIG. 11. To avoid repetition, refer to the description of S840 in FIG. 11.

S9193. The third AMF deletes AM policy control information stored in the third AMF for the terminal device. S9193 may be corresponding to S850 in FIG. 11. To avoid repetition, refer to the description of S850 in FIG. 11.

S920 and S921 may be respectively corresponding to S220 and S221 in FIG. 2. To avoid repetition, refer to the descriptions of S220 and S221 in FIG. 2.

The foregoing describes in detail, with reference to FIG. 11 and FIG. 12, a technical solution of a case in which a PCF is reused. The following describes in detail, with reference to FIG. 13 and FIG. 14, a technical solution of a case in which a PCF is not reused.

Figure 13:
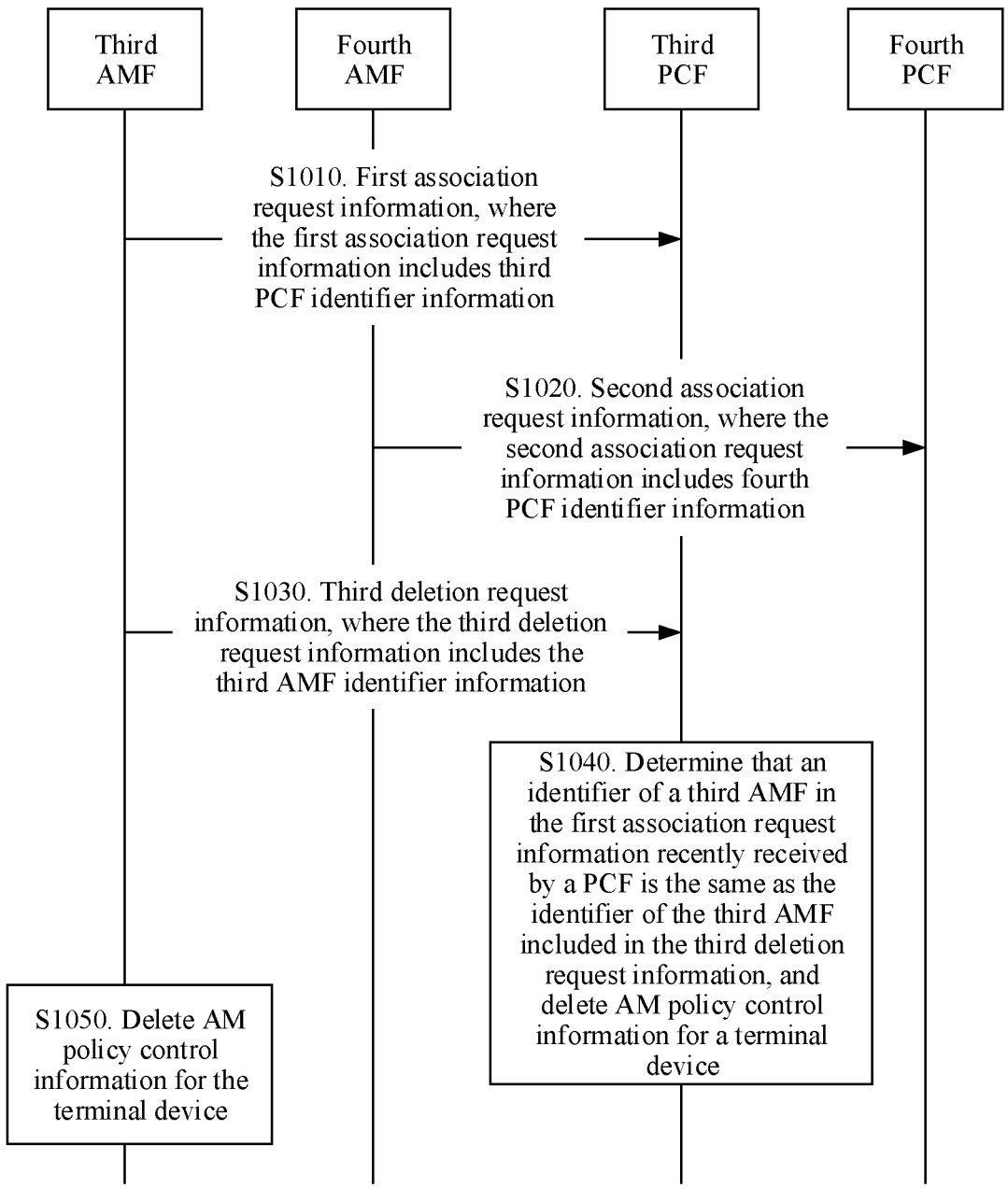
FIG. 13 is a schematic interaction diagram of an access and mobility management policy association termination method according to still another embodiment of this application.

FIG. 13 is a schematic interaction diagram of an access and mobility management policy association termination method 1000 according to still another embodiment of this application.

In the method 1000, a fourth AMF is an AMF that currently serves the terminal device, a fourth PCF is a PCF that currently serves the terminal device, and an AM policy association is established between the fourth PCF and the fourth AMF. A third AMF is an AMF that serves the terminal device before the fourth AMF serves the terminal device. In addition, in a process in which the third AMF serves the terminal device, an AM policy association is also established between a third PCF and the third AMF. The fourth PCF is a PCF that is different from the third PCF and that establishes the AM policy association with the fourth AMF.

S1010. The third AMF sends, to the third PCF, first association request information used to request to establish an AM policy association with the third PCF for the terminal device, where the first association request information further includes third AMF identifier information of the third AMF.

To be specific, in a process in which the third AMF and the third PCF establish the AM policy association, an identifier of the third AMF is added to the first association request information.

S1020. The fourth AMF sends, to the fourth PCF, second association request information used to request to establish an AM policy association with the third PCF for the terminal device, where the second association request information further includes fourth AMF identifier information of the fourth AMF.

When an AMF that previously serves the terminal device changes from the third AMF to the fourth AMF due to movement of the terminal device or for other reasons, the fourth AMF needs to establish the AM policy association with the fourth PCF. Similarly, when sending the second association request information to the fourth PCF, the fourth AMF adds an identifier of the fourth AMF to the second association request information.

S1030. After preset duration, the third AMF sends third deletion request information to the third PCF, where the third deletion request information is used to request the third PCF to delete the AM policy association between the third PCF and the third AMF for the terminal device, and the third deletion request information further includes the third AMF identifier information.

Specifically, the third AMF sends the third deletion request information to the third PCF after the preset duration, where the preset duration is greater than or equal to duration within which the fourth AMF selects a PCF, so that after obtaining a latest identifier of an AMF (that is, the identifier of the third AMF) that establishes an AM policy association with the third PCF, the third PCF may effectively compare the stored latest identifier of the third AMF with the identifier of the third AMF in the third deletion request information.

In a possible implementation, after the third AMF receives de-registration information sent by unified data management UDM, the third AMF starts a timer, where duration of the timer is the preset duration.

Referring to FIG. 2, the step of receiving, by the third AMF, a de-registration information sent by UDM may be corresponding to S215 in FIG. 2.

Because a time point at which the UDM sends the de-registration information to the third AMF is relatively close to a time point at which the fourth AMF selects a PCF, if the third AMF starts the timer after receiving the de-registration information, time may be saved.

By way of example, and not limitation, after the third AMF sends third PCF identifier information to the fourth AMF, the third AMF may also start the timer, and duration of the timer is the preset duration.

Still referring to FIG. 2, the step of sending, by the third AMF, third PCF identifier information to the fourth AMF may be corresponding to S205 in FIG. 2.

S1040. The third PCF deletes AM policy control information for the terminal device based on the third AMF identifier information and the third deletion request information.

To be specific, the third PCF compares an identifier of an AMF that is carried in received recent association request information (that is, the first association request information) with an identifier of an AMF that is carried in the third deletion request information. If it is determined that the two AMFs are the same, it indicates that the PCF is not reused, and the fourth AMF selects another PCF. Therefore, the third PCF deletes the AM policy control information in the third PCF for the terminal device.

S1050. The third AMF deletes AM policy control information for the terminal device.

Therefore, according to the access and mobility management policy association termination method provided in this embodiment of this application, each AMF (for example, the third AMF or the fourth AMF) that needs to establish an AM policy association with a PCF sends an identifier of the AMF to the PCF (for example, the third PCF) in an AM policy association connection establishment process, and after preset duration, sends deletion request information that carries an identifier of the AMF. The third PCF compares the recent identifier (for example, the identifier of the third AMF) of the AMF that is received during establishment of the AM policy association and the identifier (for example, the identifier of the third AMF) of the AMF that is carried in the received deletion request information. When the two AMFs are the same, the third PCF deletes the AM policy control information, and the AMF also deletes the AM policy control information, so that system resources are saved.

Figure 14:
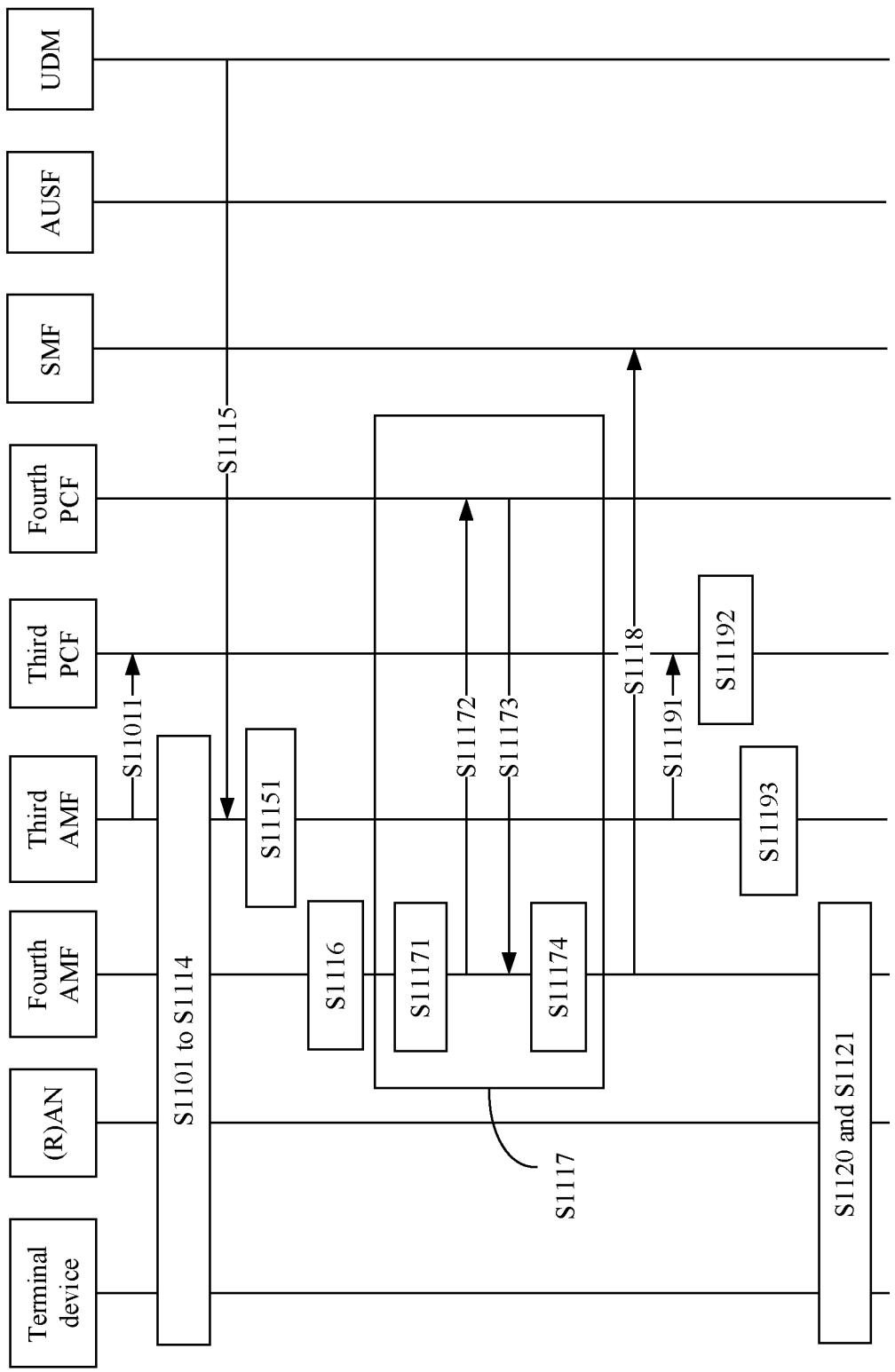
FIG. 14 is a schematic flowchart of a registration procedure according to still another embodiment of this application.

The following describes in detail, with reference to FIG. 14 by using a specific registration process, an embodiment of a case in which a PCF is not reused.

S11011. A third AMF sends first association request information to a third PCF when establishing an AM policy association with the third PCF, where the first association request information carries third AMF identifier information of the third AMF.

S1101 to S1114 may be respectively corresponding to S201 to S214 in FIG. 2. To avoid repetition, refer to the descriptions of S201 to S214 in FIG. 2.

S1115. The UDM sends de-registration information to the third AMF.

S11151. The third AMF starts a timer.

S1116. The fourth AMF selects a PCF. S1116 may be corresponding to S216 in FIG. 2. To avoid repetition, refer to the description of S216 in FIG. 2.

S1117. The fourth AMF establishes an AM policy association with a fourth PCF.

S1117 includes S11171 to S11174 that may be respectively corresponding to S2171 to S2174 in FIG. 3. In S11171, the fourth AMF sends second association request information to the fourth PCF, where the second association request information carries fourth AMF identifier information used to identify the fourth AMF.

S1118 may be corresponding to S218 in FIG. 2.

S11191. The third AMF sends third deletion request information to the third PCF. S11191 may be corresponding to S1030 in FIG. 13. To avoid repetition, refer to the description of S1030 in FIG. 13.

S11192. The third PCF deletes AM policy control information stored in the third PCF for the terminal device. S11192 may be corresponding to S1040 in FIG. 13. To avoid repetition, refer to the description of S1040 in FIG. 13.

S11193. The third AMF deletes AM policy control information stored in the third AMF for the terminal device may be corresponding to S1050 in FIG. 13. To avoid repetition, refer to the description of S1050 in FIG. 13.

S1120 and S1121 may be respectively corresponding to S220 and S221 in FIG. 2. To avoid repetition, refer to the descriptions of S220 and S221 in FIG. 2.

The foregoing describes in detail the access and mobility management policy association termination method according to the embodiments of this application with reference to FIG. 1 to FIG. 14. The following describes an access and mobility management policy association termination apparatus according to embodiments of this application with reference to FIG. 15 to FIG. 22. Technical features described in the method embodiments are also applicable to the following apparatus embodiments.

Figure 15:
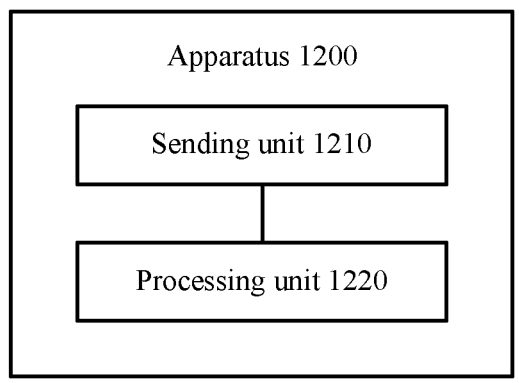
FIG. 15 to FIG. 22 each show an access and mobility management policy association termination apparatus according to an embodiment of this application.

FIG. 15 shows an access and mobility management policy association termination apparatus 1200 according to an embodiment of this application. The apparatus 1200 includes: a sending unit 1210, configured to send first policy control function PCF identifier information of a first PCF to a second AMF, where the sending unit 1210 is further configured to send first deletion request information to the first PCF, where the first deletion request information is used to request the first PCF to delete an AM policy association between the first PCF and the apparatus for a terminal device, and the first PCF is different from a second PCF; and a processing unit 1220, where the processing unit 1220 is configured to delete AM policy control information for the terminal device, where the second AMF is an AMF that currently serves the terminal device, the apparatus is an AMF that serves the terminal device before the second AMF serves the terminal device, the second PCF is a PCF that currently serves the terminal device, and the first PCF is a PCF that serves the terminal device before the second PCF serves the terminal device.

In a possible implementation, the apparatus further includes a receiving unit 1230.

The sending unit 1210 is specifically configured to:

if the receiving unit 1230 has not received, within preset duration, second deletion request information sent by the first PCF, send the first deletion request information to the second AMF, where the second deletion request information is used to request the apparatus to delete the AM policy control information between the first PCF and the apparatus for the terminal device.

In a possible implementation, the apparatus further includes the receiving unit 1230.

The processing unit 1220 is further configured to:

after the receiving unit 1230 receives de-registration information sent by unified data management UDM, start a timer, where duration of the timer is the preset duration; or after the receiving unit 1230 sends the first PCF identifier information to the second AMF, start a timer, where duration of the timer is the preset duration.

In a possible implementation, the apparatus further includes a receiving unit 1230.

The receiving unit 1230 is configured to:

receive second PCF identifier information of the second PCF that is sent by the second AMF; or receive first indication information sent by the second AMF, where the first indication information is used to indicate that the first PCF is different from the second PCF.

Therefore, according to the access and mobility management policy association termination apparatus provided in this embodiment of this application, when the second PCF selected by the second AMF is different from the first PCF, the apparatus sends, to the first PCF, the first deletion request information that is used to instruct the first PCF to delete the AM policy association, so that the first PCF may delete corresponding AM policy control information, thereby effectively saving system resources.

The access and mobility management policy association termination apparatus 1200 may be corresponding to (for example, may be configured as or may be) the first AMF described in the method 300, and each module or unit in the access and mobility management policy association termination apparatus 1200 is configured to perform various actions or processing processes performed by the first AMF in the method 300. To avoid repetition, detailed descriptions are omitted herein.

In this embodiment of this application, the apparatus 1200 may be a first AMF. In this case, the apparatus 1200 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 1210 in the apparatus 1200 shown in FIG. 15 may be corresponding to the transmitter, and the processing unit 1220 in the apparatus 1200 shown in FIG. 15 may also be corresponding to the processor. In another implementation, the transmitter and the receiver may be implemented by a same component: a transceiver.

In this embodiment of this application, the apparatus 1200 may be a chip (or a chip system) installed on a terminal device. In this case, the apparatus 1200 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the sending unit 1210 in the apparatus 1200 shown in FIG. 15 may be corresponding to the output interface, and the processing unit 1220 in the apparatus 1200 shown in FIG. 15 may be corresponding to the processor.

Figure 16:
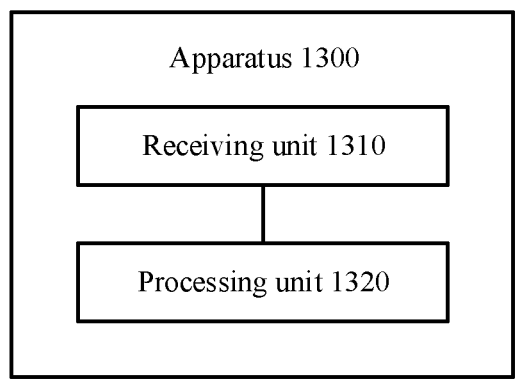

FIG. 16 shows an access and mobility management policy association termination apparatus 1300 according to an embodiment of this application. The apparatus 1300 includes:

a receiving unit 1310, configured to receive first deletion request information sent by a first access and mobility management function AMF, where the first deletion request information is used to request the apparatus to delete an AM policy association between the apparatus and the first AMF for a terminal device, and the apparatus is different from a second PCF; and a processing unit 1320, configured to delete AM policy control information for the terminal device, where the first AMF is an AMF that serves the terminal device before a second AMF serves the terminal device, the second AMF is an AMF that currently serves the terminal device, the apparatus is a PCF that serves the terminal device before the second PCF serves the terminal device, and the second PCF is a PCF that currently serves the terminal device.

Therefore, according to the access and mobility management policy association termination apparatus provided in this embodiment of this application, when the second PCF selected by the second AMF is different from the apparatus, the first AMF sends, to the apparatus, the first deletion request information that is used to instruct the apparatus to delete the AM policy association, so that the apparatus may delete the corresponding AM policy control information, thereby effectively saving system resources.

The access and mobility management policy association termination apparatus 1300 may be corresponding to (for example, may be configured as or may be) the first PCF described in the method 300, and each module or unit in the access and mobility management policy association termination apparatus 1300 is configured to perform various actions or processing processes performed by the first PCF in the method 300. To avoid repetition, detailed descriptions are omitted herein.

In this embodiment of this application, the apparatus 1300 may be a first PCF. In this case, the apparatus 1300 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 1310 in the apparatus 1300 shown in FIG. 16 may be corresponding to the receiver, and the processing unit 1320 in the apparatus 1300 shown in FIG. 16 may also be corresponding to the processor. In another implementation, the transmitter and the receiver may be implemented by a same component: a transceiver.

In this embodiment of this application, the apparatus 1300 may be a chip (or a chip system) installed on a terminal device. In this case, the apparatus 1300 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the receiving unit 1310 in the apparatus 1300 shown in FIG. 16 may be corresponding to the input interface, and the processing unit 1320 in the apparatus 1300 shown in FIG. 16 may be corresponding to the processor.

Figure 17:
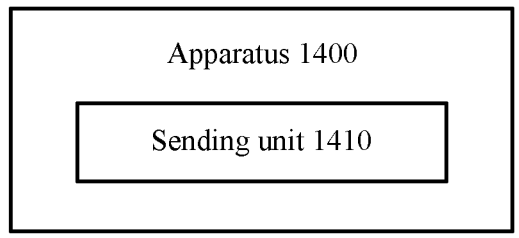

FIG. 17 shows an access and mobility management policy association termination apparatus 1400 according to an embodiment of this application. The apparatus 1400 includes:

a sending unit 1410, configured to send second policy control function PCF identifier information of a second PCF to a first AMF; or a sending unit 1410, configured to send first indication information to a first AMF, where the first indication information is used to indicate that the second PCF is different from the first PCF, where the apparatus 1400 is an AMF that currently serves a terminal device, the first AMF is an AMF that serves the terminal device before the apparatus 1400 serves the terminal device, the second PCF is a PCF that currently serves the terminal device, and the first PCF is a PCF that serves the terminal device before the second PCF serves the terminal device.

Therefore, according to the access and mobility management policy association termination apparatus provided in this embodiment of this application, the apparatus may send the second PCF identifier information or the first indication information to the first AMF, so that the first AMF may determine whether the second PCF is the same as the first PCF. In this way, when the second PCF is different from the first PCF, the first AMF may send, to the first PCF, information used to instruct the first PCF to delete an AM policy association, so that the first PCF deletes corresponding AM policy control information, and system resources are effectively saved.

The access and mobility management policy association termination apparatus 1400 may be corresponding to (for example, may be configured as or may be) the second PCF described in the method 300, and each module or unit in the access and mobility management policy association termination apparatus 1400 is configured to perform various actions or processing processes performed by the second PCF in the method 300. To avoid repetition, detailed descriptions are omitted herein.

In this embodiment of this application, the apparatus 1400 may be a second AMF. In this case, the apparatus 1400 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 1410 in the apparatus 1400 shown in FIG. 17 may be corresponding to the transmitter.

In this embodiment of this application, the apparatus 1400 may be a chip (or a chip system) installed on a terminal device. In this case, the apparatus 1400 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the sending unit 1410 in the apparatus 1400 shown in FIG. 17 may be corresponding to the output interface.

Figure 18:
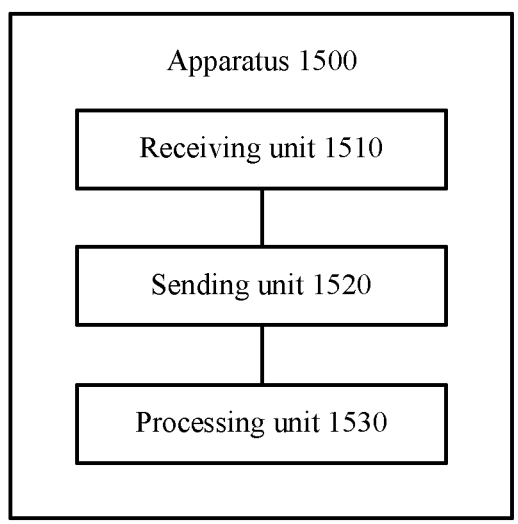

FIG. 18 shows an access and mobility management policy association termination apparatus 1500 according to an embodiment of this application. The apparatus 1500 includes:

a receiving unit 1510, configured to receive association request information sent by a second access and mobility management function AMF, where the association request information is used to request to establish an AM policy association with the apparatus for a terminal device, and the association request information further includes second indication information used to determine whether a first PCF is the same as the apparatus;

a sending unit 1520, configured to send second deletion request information to a first AMF according to the second indication information, where the second deletion request information is used to request the first AMF to delete AM policy control information between the first PCF and the first AMF for the terminal device; and a processing unit 1530, configured to keep AM policy control information for the terminal device, where the second AMF is an AMF that currently serves the terminal device, the first AMF is an AMF that serves the terminal device before the second AMF serves the terminal device, the apparatus is a PCF that currently serves the terminal device, and the first PCF is a PCF that serves the terminal device before the apparatus serves the terminal device.

In a possible implementation, the sending unit 1520 is specifically configured to:

when the first PCF is the same as the apparatus, send the second deletion request information to the first AMF.

In a possible implementation, the second indication information includes first PCF identifier information of the first PCF.

The processing unit 1530 is further configured to:

determine, based on the first PCF identifier information and the apparatus, that the first PCF is the same as the apparatus.

Therefore, according to the access and mobility management policy association termination apparatus provided in this embodiment of this application, the apparatus that has established the AM policy association with the second AMF receives the second indication information that is sent by the second AMF and that is used to determine whether the first PCF that has established an AM policy association with the first AMF is the same as the apparatus, where the first AMF is an AMF that serves the terminal device before the second AMF serves the terminal device, and the apparatus sends the deletion request information according to the second indication information, so that the second AMF may delete the AM policy control information for the terminal device, and system resources are also saved.

The access and mobility management policy association termination apparatus 1500 may be corresponding to (for example, may be configured as or may be) the second PCF described in the method 700, and each module or unit in the access and mobility management policy association termination apparatus 1500 is configured to perform various actions or processing processes performed by the second PCF in the method 700. To avoid repetition, detailed descriptions are omitted herein.

In this embodiment of this application, the apparatus 1500 may be a second PCF. In this case, the apparatus 1500 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 1510 in the apparatus 1500 shown in FIG. 18 may be corresponding to the receiver, the sending unit 1520 in the apparatus 1500 shown in FIG. 18 may be corresponding to the transmitter, and the processing unit 1530 in the apparatus 1500 shown in FIG. 18 may also be corresponding to the processor. In another implementation, the transmitter and the receiver may be implemented by a same component: a transceiver.

In this embodiment of this application, the apparatus 1500 may be a chip (or a chip system) installed on a terminal device. In this case, the apparatus 1500 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the receiving unit 1510 in the apparatus 1500 shown in FIG. 18 may be corresponding to the input interface, the sending unit 1520 in the apparatus 1500 shown in FIG. 18 may be corresponding to the output interface, and the processing unit 1530 in the apparatus 1500 shown in FIG. 18 may be corresponding to the processor.

Figure 19:
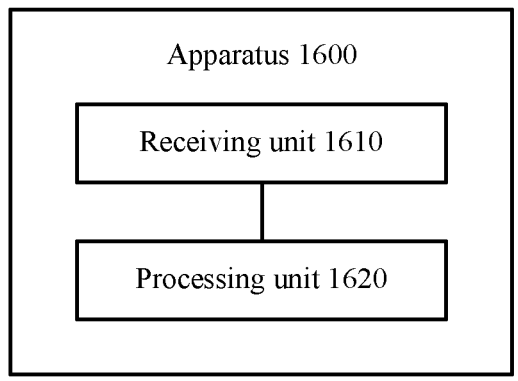

FIG. 19 shows an access and mobility management policy association termination apparatus 1600 according to an embodiment of this application. The apparatus 1600 includes:

a receiving unit 1610, configured to receive second deletion request information sent by a second policy control function PCF, where the second deletion request information is used to request the apparatus to delete AM policy control information between a first PCF and the apparatus for a terminal device, and the first PCF is the same as the second PCF; and a processing unit 1620, configured to delete the AM policy control information for the terminal device, where the apparatus is an AMF that serves the terminal device before a second AMF serves the terminal device, the second AMF is an AMF that currently serves the terminal device, the second PCF is a PCF that currently serves the terminal device, and the first PCF is a PCF that serves the terminal device before the second PCF serves the terminal device.

Therefore, according to the access and mobility management policy association termination apparatus provided in this embodiment of this application, the apparatus that has established an AM policy association with the first PCF deletes the AM policy control information for the terminal device according to the received second deletion request information sent by the second AMF, so that system resources are saved.

The access and mobility management policy association termination apparatus 1600 may be corresponding to (for example, may be configured as or may be) the first AMF described in the method 700, and each module or unit in the access and mobility management policy association termination apparatus 1600 is configured to perform various actions or processing processes performed by the first AMF in the method 700. To avoid repetition, detailed descriptions are omitted herein.

In this embodiment of this application, the apparatus 1600 may be a first AMF. In this case, the apparatus 1600 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 1610 in the apparatus 1600 shown in FIG. 19 may be corresponding to the receiver, and the processing unit 1620 in the apparatus 1600 shown in FIG. 19 may also be corresponding to the processor. In another implementation, the transmitter and the receiver may be implemented by a same component: a transceiver.

In this embodiment of this application, the apparatus 1600 may be a chip (or a chip system) installed on a terminal device. In this case, the apparatus 1600 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the receiving unit 1610 in the apparatus 1600 shown in FIG. 19 may be corresponding to the input interface, and the processing unit 1620 in the apparatus 1600 shown in FIG. 19 may be corresponding to the processor.

Figure 20:
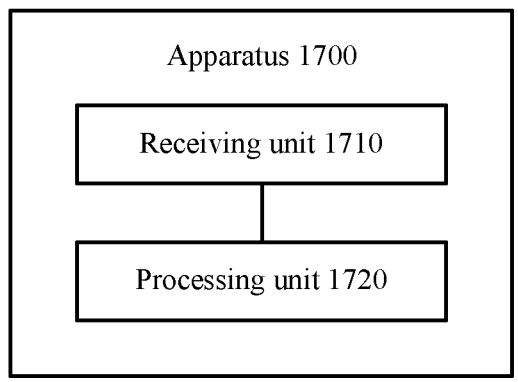

FIG. 20 shows an access and mobility management policy association termination apparatus 1700 according to an embodiment of this application. The apparatus 1700 includes:

a receiving unit 1710, configured to receive first association request information that is sent by a third access and mobility management function AMF and that is used to request to establish an AM policy association with the apparatus 1700 for a terminal device, where the first association request information further includes third AMF identifier information used to identify the third AMF, where the receiving unit 1710 is further configured to receive second association request information sent by a fourth access and mobility management function AMF, where the second association request information is used to request to establish an AM policy association with the third PCF for the terminal device, and the second association request information further includes fourth AMF identifier information used to identify the fourth AMF; and the receiving unit 1710 is further configured to receive third deletion request information sent by the third AMF, where the third deletion request information is used to request the third PCF to delete the AM policy association between the third PCF and the third AMF for the terminal device, and the third deletion request information further includes the third AMF identifier information; and a processing unit 1720, configured to keep AM policy control information for the terminal device based on the fourth AMF identifier information and the third deletion request information.

Therefore, according to the access and mobility management policy association termination apparatus provided in this embodiment of this application, each AMF (for example, the third AMF or the fourth AMF) that needs to establish an AM policy association with a PCF (for example, the third PCF) sends an identifier of the AMF to the third PCF in an AM policy association connection establishment process, and after preset duration, sends deletion request information that carries an identifier of the AMF. The third PCF compares the recent identifier (for example, an identifier of the fourth AMF) of the AMF that is received during establishment of the AM policy association and the identifier (for example, an identifier of the third AMF) of the AMF that is carried in the received deletion request information. When the two AMFs are different, the third PCF keeps the AM policy control information, and only the third AMF deletes AM policy control information, so that the AM policy control information in the PCF is reused, and system resources are also saved.

The access and mobility management policy association termination apparatus 1700 may be corresponding to (for example, may be configured as or may be) the third PCF described in the method 800, and each module or unit in the access and mobility management policy association termination apparatus 1700 is configured to perform various actions or processing processes performed by the third PCF in the method 800. To avoid repetition, detailed descriptions are omitted herein.

In this embodiment of this application, the apparatus 1700 may be a third PCF. In this case, the apparatus 1700 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 1710 in the apparatus 1700 shown in FIG. 20 may be corresponding to the receiver, and the processing unit 1720 in the apparatus 1700 shown in FIG. 20 may also be corresponding to the processor. In another implementation, the transmitter and the receiver may be implemented by a same component: a transceiver.

In this embodiment of this application, the apparatus 1700 may be a chip (or a chip system) installed on a terminal device. In this case, the apparatus 1700 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the receiving unit 1710 in the apparatus 1700 shown in FIG. 20 may be corresponding to the input interface, and the processing unit 1720 in the apparatus 1700 shown in FIG. 20 may be corresponding to the processor.

Figure 21:
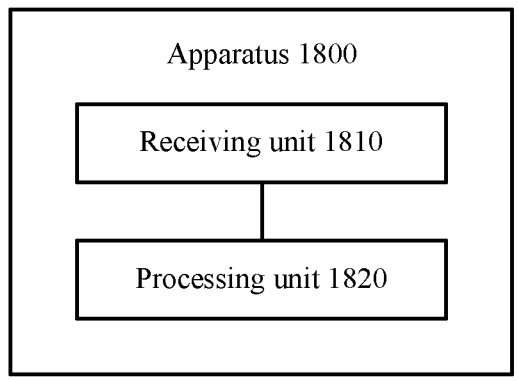

FIG. 21 shows an access and mobility management policy association termination apparatus 1800 according to an embodiment of this application. The apparatus 1800 includes:

a receiving unit 1810, configured to receive first association request information sent by a third access and mobility management function AMF, where the first association request information is used to request to establish an AM policy association with the the apparatus 1800 for a terminal device, and the first association request information further includes third AMF identifier information used to identify the third AMF, where the receiving unit 1810 is further configured to receive third deletion request information sent by the third AMF, where the third deletion request information is used to request the third PCF to delete AM policy control information between the third PCF and the third AMF for the terminal device, and the third deletion request information further includes the third AMF identifier information; and a processing unit 1820, configured to delete the AM policy control information for the terminal device based on the third AMF identifier information and the third deletion request information.

Therefore, according to the access and mobility management policy association termination apparatus provided in this embodiment of this application, each AMF (for example, the third AMF or a fourth AMF) that needs to establish an AM policy association with a PCF sends an identifier of the AMF to the PCF (for example, the third PCF) in an AM policy association connection establishment process, and after preset duration, sends deletion request information that carries an identifier of the AMF. The third PCF compares the recent identifier (for example, an identifier of the third AMF) of the AMF that is received during establishment of the AM policy association and the identifier (for example, the identifier of the third AMF) of the AMF that is carried in the received deletion request information. When the two AMFs are the same, the third PCF deletes the AM policy control information, and the AMF also deletes AM policy control information, so that system resources are saved.

The access and mobility management policy association termination apparatus 1800 may be corresponding to (for example, may be configured as or may be) the third PCF described in the method 900, and each module or unit in the access and mobility management policy association termination apparatus 1800 is configured to perform various actions or processing processes performed by the third PCF in the method 900. To avoid repetition, detailed descriptions are omitted herein.

In this embodiment of this application, the apparatus 1800 may be a third PCF. In this case, the apparatus 1800 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the receiving unit 1810 in the apparatus 1800 shown in FIG. 21 may be corresponding to the receiver, and the processing unit 1820 in the apparatus 1800 shown in FIG. 21 may also be corresponding to the processor. In another implementation, the transmitter and the receiver may be implemented by a same component: a transceiver.

In this embodiment of this application, the apparatus 1800 may be a chip (or a chip system) installed on a terminal device. In this case, the apparatus 1800 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the receiving unit 1810 in the apparatus 1800 shown in FIG. 21 may be corresponding to the input interface, and the processing unit 1820 in the apparatus 1800 shown in FIG. 21 may be corresponding to the processor.

Figure 22:
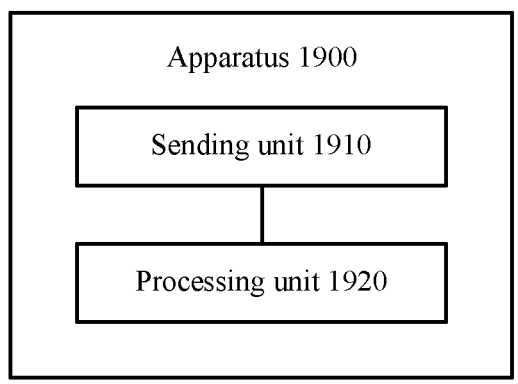

FIG. 22 shows an access and mobility management policy association termination apparatus 1900 according to an embodiment of this application. The apparatus 1900 includes:

a sending unit 1910, configured to send, to a third policy control function PCF, first association request information that is used to request to establish an AM policy association with the third AMF for a terminal device, where the first association request information further includes third AMF identifier information used to identify the third AMF, where the sending unit 1910 is further configured to send third deletion request information to the third PCF after preset duration, where the third deletion request information is used to request the third PCF to delete AM policy control information between the third PCF and the third AMF for the terminal device, and the third deletion request information further includes the third AMF identifier information; and a processing unit 1920, configured to delete AM policy control information for the terminal device.

Therefore, according to the access and mobility management policy association termination apparatus provided in this embodiment of this application, each AMF (for example, the third AMF) sends an identifier of the AMF to a PCF (for example, the third PCF) in an AM policy association connection establishment process, and after preset duration, sends deletion request information that carries an identifier of the AMF. In this way, the third PCF may compare the recent identifier of the AMF (for example, the third AMF or another AMF) that is received during establishment of the AM policy association and the identifier (for example, an identifier of the third AMF) of the AMF that is carried in the received deletion request information. When the two AMFs are different, the third PCF keeps the AM policy control information, and only the third AMF deletes the AM policy control information. Alternatively, when the two AMFs are the same, the third PCF deletes the AM policy control information, and the third AMF also deletes the AM policy control information. In this way, system resources are saved.

In a possible implementation, the apparatus further includes a receiving unit 1930. The processing unit 1920 is further configured to:

after the receiving unit 1930 receives de-registration information sent by unified data management UDM, start a timer, where duration of the timer is the preset duration.

Because a time point at which the UDM sends the de-registration information to the first AMF is relatively close to a time point at which the second AMF selects a PCF, if the first AMF starts the timer after receiving the de-registration information, time may be saved.

The access and mobility management policy association termination apparatus 1900 may be corresponding to (for example, may be configured as or may be) the third AMF described in the method 800 or 900, and each module or unit in the access and mobility management policy association termination apparatus 1900 is configured to perform various actions or processing processes performed by the third AMF in the method 800 or 900. To avoid repetition, detailed descriptions are omitted herein.

In this embodiment of this application, the apparatus 1900 may be a third AMF. In this case, the apparatus 1900 may include a processor, a transmitter, and a receiver. The processor, the transmitter, and the receiver are communicatively connected. Optionally, the apparatus further includes a memory, and the memory is communicatively connected to the processor. Optionally, the processor, the memory, the transmitter, and the receiver may be communicatively connected. The memory may be configured to store an instruction. The processor is configured to execute the instruction stored in the memory, to control the transmitter to send information or control the receiver to receive a signal.

In this case, the sending unit 1910 in the apparatus 1900 shown in FIG. 22 may be corresponding to the transmitter, and the processing unit 1920 in the apparatus 1900 shown in FIG. 22 may also be corresponding to the processor. In another implementation, the transmitter and the receiver may be implemented by a same component: a transceiver.

In this embodiment of this application, the apparatus 1900 may be a chip (or a chip system) installed on a terminal device. In this case, the apparatus 1900 may include a processor and an input/output interface. The processor may be communicatively connected to a transceiver of a network device through the input/output interface. Optionally, the apparatus further includes a memory, and the memory is communicatively connected to the processor. Optionally, the processor, the memory, and the transceiver may be communicatively connected, the memory may be configured to store an instruction, and the processor is configured to execute the instruction stored in the memory, to control the transceiver to send information or a signal.

In this case, the sending unit 1910 in the apparatus 1900 shown in FIG. 22 may be corresponding to the output interface, and the processing unit 1920 in the apparatus 1900 shown in FIG. 22 may be corresponding to the processor.

It should be noted that, the foregoing method embodiments in the embodiments of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in a memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications system, comprising:
   a first access and mobility management function apparatus; and
   a second access and mobility management function apparatus;
   the first access and mobility management function apparatus being configured to send first policy control function apparatus identifier information of a first policy control function apparatus to the second access and mobility management function apparatus, after the second access and mobility management apparatus takes over serving a terminal from the first access and mobility management apparatus;
   the second access and mobility management function apparatus being configured to send second policy control function apparatus identifier information of a second policy control function apparatus to the first access and mobility management function apparatus, wherein the first policy control function apparatus is different from the second policy control function apparatus, the second policy control function apparatus is serving the terminal device, and the first policy control function apparatus served the terminal device before the second policy control function apparatus serves the terminal device;
   the first access and mobility management function apparatus being configured to send a first deletion request to the first policy control function apparatus to request the first policy control function apparatus to delete an access and mobility management (AM) policy association between the first policy control function apparatus and the first access and mobility management function apparatus for the terminal device; and
   the first access and mobility management function apparatus being further configured to delete AM policy control information for the terminal device.

2. The communications system according to claim 1, wherein the communications system further comprises the first policy control function apparatus, and the first policy control function apparatus is configured to delete the AM policy association between the first policy control function apparatus and the first access and mobility management function apparatus for the terminal device, in response to the first deletion request.

3. A communications system, comprising:
   a first access and mobility management function apparatus; and
   a second access and mobility management function apparatus;
   the first access and mobility management function apparatus being configured to send first policy control function apparatus identifier information of a first policy control function apparatus to the second access and mobility management function apparatus, after the second access and mobility management apparatus takes over serving a terminal from the first access and mobility management apparatus;
   the first access and mobility management function apparatus being configured to receive second policy control function apparatus identifier information of a second policy control function apparatus from the second access and mobility management function apparatus, wherein the first policy control function apparatus is different from the second policy control function apparatus, the second policy control function apparatus is serving the terminal device, and the first policy control function apparatus served the terminal device before the second policy control function apparatus serves the terminal device;
   the first access and mobility management function apparatus being configured to send first deletion request to the first policy control function apparatus to request the first policy control function apparatus to delete an access and mobility management (AM) policy association between the first policy control function apparatus and the first access and mobility management function apparatus for the terminal device;
   the first policy control function apparatus being configured to, in response to the first deletion request, delete the AM policy association between the first policy control function apparatus and the first access and mobility management function apparatus for the terminal device; and
   the first access and mobility management function apparatus being further configured to delete AM policy control information for the terminal device.

4. The communications system according to claim 3, wherein the communications system further comprises the second access and mobility management function apparatus, and the second access and mobility management function apparatus is configured to send the second policy control function apparatus identifier information to the first access and mobility management function apparatus.

5. An access and mobility management policy association termination method, comprising:

sending, by a first access and mobility management function apparatus, first policy control function apparatus identifier information of a first policy control function apparatus to a second access and mobility management function apparatus, after the second access and mobility management apparatus takes over serving a terminal from the first access and mobility management apparatus;

sending, by the second access and mobility management function apparatus, second policy control function apparatus identifier information of a second policy control function apparatus to the first access and mobility management function apparatus, wherein the first policy control function apparatus is different from the second policy control function apparatus, the second policy control function apparatus is serving the terminal device, and the first policy control function apparatus served the terminal device before the second policy control function apparatus serves the terminal device;

sending, by the first access and mobility management function apparatus, first deletion request to the first policy control function apparatus to request the first policy control function apparatus to delete an access and mobility management (AM) policy association between the first policy control function apparatus and the first access and mobility management function apparatus for the terminal device; and deleting, by the first access and mobility management function apparatus, AM policy control information for the terminal device.

6. The method according to claim 5, further comprising:

deleting, by the first policy control function apparatus, the AM policy association between the first policy control function apparatus and the first access and mobility management function apparatus for the terminal device, in response to the first deletion request.

* * * * *